(12) United States Patent
Komada et al.

(10) Patent No.: US 10,167,041 B2
(45) Date of Patent: Jan. 1, 2019

(54) BICYCLE OPERATING DEVICE

(71) Applicant: SHIMANO INC., Sakai (JP)

(72) Inventors: Yasuyuki Komada, Sakai (JP); Kohei Ohyabu, Sakai (JP)

(73) Assignee: SHIMANO INC., Sakai (JP)

( * ) Notice: Subject to any disclaimer, the term of this patent is extended or adjusted under 35 U.S.C. 154(b) by 0 days.

(21) Appl. No.: 15/340,938

(22) Filed: Nov. 1, 2016

(65) Prior Publication Data

US 2018/0118301 A1    May 3, 2018

(51) Int. Cl.
*B62K 23/02*    (2006.01)
*B62K 23/06*    (2006.01)

(52) U.S. Cl.
CPC ............ *B62K 23/02* (2013.01); *B62K 23/06* (2013.01)

(58) Field of Classification Search
CPC .......... B62L 3/02; B62L 3/023; B62K 23/02; B62K 23/06
USPC .................................................. 188/26, 344
See application file for complete search history.

(56) References Cited

U.S. PATENT DOCUMENTS

| | | | | |
|---|---|---|---|---|
| 4,771,649 A * | 9/1988 | Modolo | ..................... | B62L 3/02 188/344 |
| 7,055,323 B2 * | 6/2006 | Idei | .......................... | B60T 11/16 60/550 |
| 7,565,848 B2 * | 7/2009 | Fujii | ...................... | B62K 23/02 74/473.12 |
| 8,453,534 B2 * | 6/2013 | Tsai | ........................... | B62L 3/02 74/502.2 |
| 8,863,912 B2 | 10/2014 | Matsushita | | |
| 9,268,354 B1 * | 2/2016 | Vorhies | ..................... | G05G 1/04 |
| 9,403,512 B2 | 8/2016 | Matsushita et al. | | |
| 9,446,813 B2 * | 9/2016 | Shipman | ................ | B62K 23/06 |
| 9,630,677 B2 * | 4/2017 | Jordan | ....................... | B62L 3/02 |
| 2006/0266594 A1 * | 11/2006 | Tsai | ........................ | B62K 23/06 188/24.22 |
| 2009/0114057 A1 * | 5/2009 | Fukui | ...................... | B62K 23/06 74/551.8 |
| 2009/0152061 A1 * | 6/2009 | Tsai | ......................... | B60T 11/16 188/344 |
| 2009/0152063 A1 * | 6/2009 | Tsai | ......................... | B60T 11/16 188/344 |
| 2011/0031078 A1 * | 2/2011 | Matsushita | ............. | B60T 7/102 188/344 |
| 2015/0291247 A1 * | 10/2015 | Fukao | ..................... | B62L 3/023 74/473.14 |

(Continued)

*Primary Examiner* — Thomas J Williams
(74) *Attorney, Agent, or Firm* — Mori & Ward, LLP

(57) ABSTRACT

A bicycle operating device comprises a base member, an operating member, and a piston. The base member has a longitudinal axis defined along a center axis of a free end of a bicycle handlebar in a mounting state where the base member is mounted to the free end of the bicycle handlebar. The base member includes a cylinder bore having a cylinder center axis. The cylinder bore is at least partly arranged in the bicycle handlebar in the mounting state. The operating member is pivotally coupled to the base member about a pivot axis. The cylinder center axis is inclined relative to the longitudinal axis by an inclination angle equal to or larger than 4 degrees. The piston is movably provided in the cylinder bore and operatively coupled to the operating member to move in the cylinder bore in response to a pivotal movement of the operating member.

25 Claims, 23 Drawing Sheets

(56) References Cited

U.S. PATENT DOCUMENTS

2018/0118303 A1* 5/2018 Komada ................ B62L 3/023

* cited by examiner

BICYCLE OPERATING DEVICE

BACKGROUND OF THE INVENTION

Field of the Invention

The present invention relates to a bicycle operating device.

Discussion of the Background

Bicycling is becoming an increasingly more popular form of recreation as well as a means of transportation. Moreover, bicycling has become a very popular competitive sport for both amateurs and professionals. Whether the bicycle is used for recreation, transportation or competition, the bicycle industry is constantly improving the various components of the bicycle. One bicycle component that has been extensively redesigned is an operating device.

SUMMARY OF THE INVENTION

In accordance with a first aspect of the present invention, a bicycle operating device comprises a base member, an operating member, and a piston. The base member is configured to be mounted to a free end of a bicycle handlebar. The base member has a longitudinal axis defined along a center axis of the free end of the bicycle handlebar in a mounting state where the base member is mounted to the free end of the bicycle handlebar. The base member includes a cylinder bore having a cylinder center axis. The cylinder bore is at least partly arranged in the bicycle handlebar in the mounting state. The operating member is pivotally coupled to the base member about a pivot axis. The cylinder center axis is inclined relative to the longitudinal axis by an inclination angle equal to or larger than 4 degrees. The piston is movably provided in the cylinder bore and operatively coupled to the operating member to move in the cylinder bore in response to a pivotal movement of the operating member.

With the bicycle operating device according to the first aspect, it is possible to improve design freedom of the bicycle operating device by adjusting the inclination angle of the cylinder center axis.

In accordance with a second aspect of the present invention, a bicycle operating device comprises a base member, an operating member, and a piston. The base member is configured to be mounted to a free end of a bicycle handlebar. The base member has a longitudinal axis defined along a center axis of the free end of the bicycle handlebar in a mounting state where the base member is mounted to the free end of the bicycle handlebar. The base member includes a cylinder bore and a reservoir bore. The cylinder bore has a cylinder center axis. The reservoir bore is connected to the cylinder bore. The operating member is pivotally coupled to the base member about a pivot axis. The cylinder center axis is inclined relative to the longitudinal axis. The piston is movably provided in the cylinder bore and operatively coupled to the operating member to move in the cylinder bore in response to a pivotal movement of the operating member.

With the bicycle operating device according to the second aspect, it is possible to improve design freedom of the bicycle operating device including the reservoir bore.

In accordance with a third aspect of the present invention, a bicycle operating device comprises a base member, an operating member, and a piston. The base member is configured to be mounted to a free end of a bicycle handlebar. The base member has a longitudinal axis defined along a center axis of the free end of the bicycle handlebar in a mounting state where the base member is mounted to the free end of the bicycle handlebar. The base member includes a cylinder bore and a reservoir bore connected to the cylinder bore. The reservoir bore includes a lid opening having a maximum width. The reservoir bore extends from the lid opening and having a maximum depth larger than the maximum width. The operating member is pivotally coupled to the base member about a pivot axis. The piston is movably provided in the cylinder bore and operatively coupled to the operating member to move in the cylinder bore in response to a pivotal movement of the operating member.

With the bicycle operating device according to the third aspect, it is possible to accomplish an ideal arrangement of the hydraulic unit with simple manufacturing processes of the base member. Therefore, it enhances a yield rate and decreases a manufacturing cost for manufacturing the bicycle operating device.

In accordance with a fourth aspect of the present invention, a bicycle operating device comprises a base member and an operating member. The base member is configured to be mounted to a free end of a bicycle handlebar. The base member has a longitudinal axis defined along a center axis of the free end of the bicycle handlebar in a mounting state where the base member is mounted to the free end of the bicycle handlebar. The operating member is pivotally coupled to the base member about a pivot axis. The pivot axis is closer to the longitudinal axis than an outer circumferential surface of the free end of the bicycle handlebar in a direction perpendicular to the longitudinal axis in the mounting state.

With the bicycle operating device according to the fourth aspect, it is possible to effectively arrange the pivot axis in the base member. This can make the bicycle operating device compact.

In accordance with a fifth aspect of the present invention, the bicycle operating device according to the fourth aspect further comprises a piston operatively coupled to the operating member so as to be moved in response to a pivotal movement of the operating member. The base member includes a cylinder bore in which the piston is movably arranged.

With the bicycle operating device according to the fifth aspect, it is possible to operate a hydraulic bicycle component.

In accordance with a sixth aspect of the present invention, the bicycle operating device according to any one of the first to fourth aspects is configured so that the base member includes a reservoir bore connected to the cylinder bore.

With the bicycle operating device according to the sixth aspect, it is possible to improve hydraulic performance of the bicycle operating device.

In accordance with a seventh aspect of the present invention, the bicycle operating device according to the sixth aspect is configured so that the reservoir bore is closer to the pivot axis than the cylinder bore.

With the bicycle operating device according to the seventh aspect, it is possible to effectively utilize an area provided around the pivot axis as an area in which the reservoir bore is provided. This can make the bicycle operating device compact.

In accordance with an eighth aspect of the present invention, the bicycle operating device according to the sixth or seventh aspect is configured so that the reservoir bore has a reservoir center axis. The pivot axis is provided between the reservoir center axis and the cylinder center axis.

With the bicycle operating device according to the eighth aspect, it is possible to more effectively utilize an area provided between the reservoir center axis and the cylinder center axis as an area in which the pivot axis is provided. This can make the bicycle operating device compact.

In accordance with a ninth aspect of the present invention, the bicycle operating device according to any one of the sixth to eighth aspects is configured so that the reservoir bore has a reservoir center axis extending along the cylinder center axis.

With the bicycle operating device according to the ninth aspect, it is possible to effectively arrange the cylinder bore and the reservoir bore in the base member. This can make the bicycle operating device compact.

In accordance with a tenth aspect of the present invention, the bicycle operating device according to any one of the sixth to ninth aspects is configured so that the base member includes a bleeding port to bleed a hydraulic fluid from the reservoir bore.

With the bicycle operating device according to the tenth aspect, it is possible to easily bleed the hydraulic fluid from the reservoir bore during maintenance.

In accordance with an eleventh aspect of the present invention, the bicycle operating device according to the tenth aspect is configured so that the pivot axis is closer to the longitudinal axis of the base member than the bleeding port in a direction perpendicular to the longitudinal axis.

With the bicycle operating device according to the eleventh aspect, it is possible to effectively arrange the pivot axis in the base member regardless of a position of the bleeding port. This can make the bicycle operating device compact.

In accordance with a twelfth aspect of the present invention, the bicycle operating device according to any one of the first to eleventh aspects is configured so that the pivot axis is closer to the longitudinal axis than an outer circumferential surface of the free end of the bicycle handlebar in a direction perpendicular to the longitudinal axis in the mounting state.

With the bicycle operating device according to the twelfth aspect, it is possible to effectively arrange the pivot axis in the base member. This can make the bicycle operating device compact.

In accordance with a thirteenth aspect of the present invention, the bicycle operating device according to the twelfth aspect is configured so that the base member includes a mounting portion configured to be mounted within an interior of the free end of the bicycle handlebar in the mounting state. The pivot axis is closer to the longitudinal axis than an outer circumferential surface of the mounting portion in a direction perpendicular to the longitudinal axis.

With the bicycle operating device according to the thirteenth aspect, it is possible to make the bicycle operating device more compact.

In accordance with a fourteenth aspect of the present invention, the bicycle operating device according to any one of the first to thirteenth aspects is configured so that the inclination angle is equal to or smaller than 60 degrees.

With the bicycle operating device according to the fourteenth aspect, it is possible to improve design freedom of the bicycle operating device by adjusting the inclination angle of the cylinder center axis.

In accordance with a fifteenth aspect of the present invention, the bicycle operating device according to any one of the first to fourteenth aspects is configured so that the cylinder center axis and the longitudinal axis of the base member define a reference plane.

With the bicycle operating device according to the fifteenth aspect, it is possible to make the bicycle operating device compact.

In accordance with a sixteenth aspect of the present invention, the bicycle operating device according to the fifteenth aspect is configured so that the pivot axis is perpendicular to the reference plane.

With the bicycle operating device according to the sixteenth aspect, it is possible to easily operate the operating member.

In accordance with a seventeenth aspect of the present invention, the bicycle operating device according to the fifteenth or sixteenth aspect is configured so that the base member has a symmetrical shape relative to the reference plane.

With the bicycle operating device according to the seventeenth aspect, it is possible to utilize the base member in both a right-side operating device and a left-side operating device. This can reduce manufacturing cost of the bicycle operating device.

In accordance with an eighteenth aspect of the present invention, the bicycle operating device according to any one of the first to seventeenth aspects further comprises an additional operating member attached to the base member to operate an additional bicycle component.

With the bicycle operating device according to the eighteenth aspect, it is possible to operate the additional bicycle component in addition to the bicycle component.

In accordance with a nineteenth aspect of the present invention, the bicycle operating device according to the eighteenth aspect is configured so that the additional operating member includes an electrical switch configured to receive a user input to operate the additional bicycle component.

With the bicycle operating device according to the nineteenth aspect, it is possible to electrically operate the additional bicycle component.

In accordance with a twentieth aspect of the present invention, the bicycle operating device according to any one of the first to nineteenth aspects is configured so that the base member includes a bar-end contact surface configured to contact an end surface of the free end of the bicycle handlebar in the mounting state.

With the bicycle operating device according to the twentieth aspect, it is possible to fixedly mount the bicycle operating device to the free end of the bicycle handlebar.

In accordance with a twenty-first aspect of the present invention, the bicycle operating device according to any one of the first to twentieth aspects is configured so that the base member includes a cable guide portion configured to guide a control cable such that the control cable is unexposed to an outside of the bicycle handlebar in the mounting state.

With the bicycle operating device according to the twenty-first aspect, it is possible to simplify appearance of the bicycle operating device.

In accordance with a twenty-second aspect of the present invention, the bicycle operating device according to the twenty-first aspect is configured so that the base member includes a mounting portion configured to be mounted within an interior of the free end of the bicycle handlebar. The cable guide portion is at least partly provided on the mounting portion.

With the bicycle operating device according to the twenty-second aspect, it is possible to easily conduct the control cable by using the cable guide portion.

In accordance with a twenty-third aspect of the present invention, the bicycle operating device according to any one of the first to twenty-second aspects is configured so that the cylinder center axis is inclined relative to the longitudinal axis as viewed along the pivot axis.

With the bicycle operating device according to the twenty-third aspect, it is possible to improve design freedom of the bicycle operating device by adjusting the inclination angle of the cylinder center axis.

In accordance with a twenty-fourth aspect of the present invention, the bicycle operating device according to twenty-third aspect is configured so that the cylinder center axis is downwardly inclined in a reference direction in the mounting state. The reference direction is defined to be parallel to the longitudinal axis and to be directed from the free end of the bicycle handlebar toward the pivot axis.

With the bicycle operating device according to the twenty-fourth aspect, it is possible to make an upper part of the bicycle operating device compact.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings.

DESCRIPTION OF THE EMBODIMENTS

Figure 1:
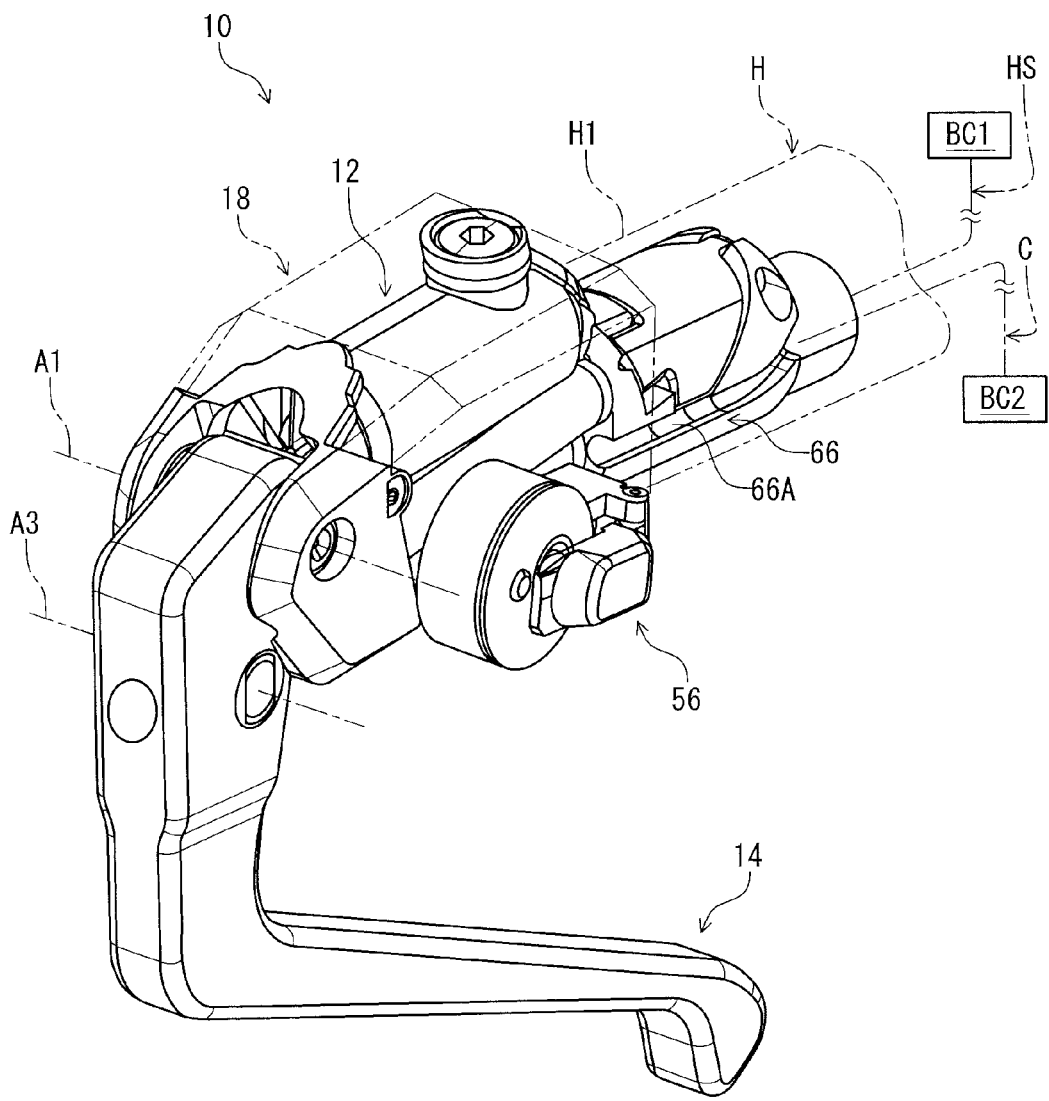
FIG. 1 is a perspective view of a bicycle operating device in accordance with an embodiment.

The embodiment(s) will now be described with reference to the accompanying drawings, wherein like reference numerals designate corresponding or identical elements throughout the various drawings.

First Embodiment

Figure 2:
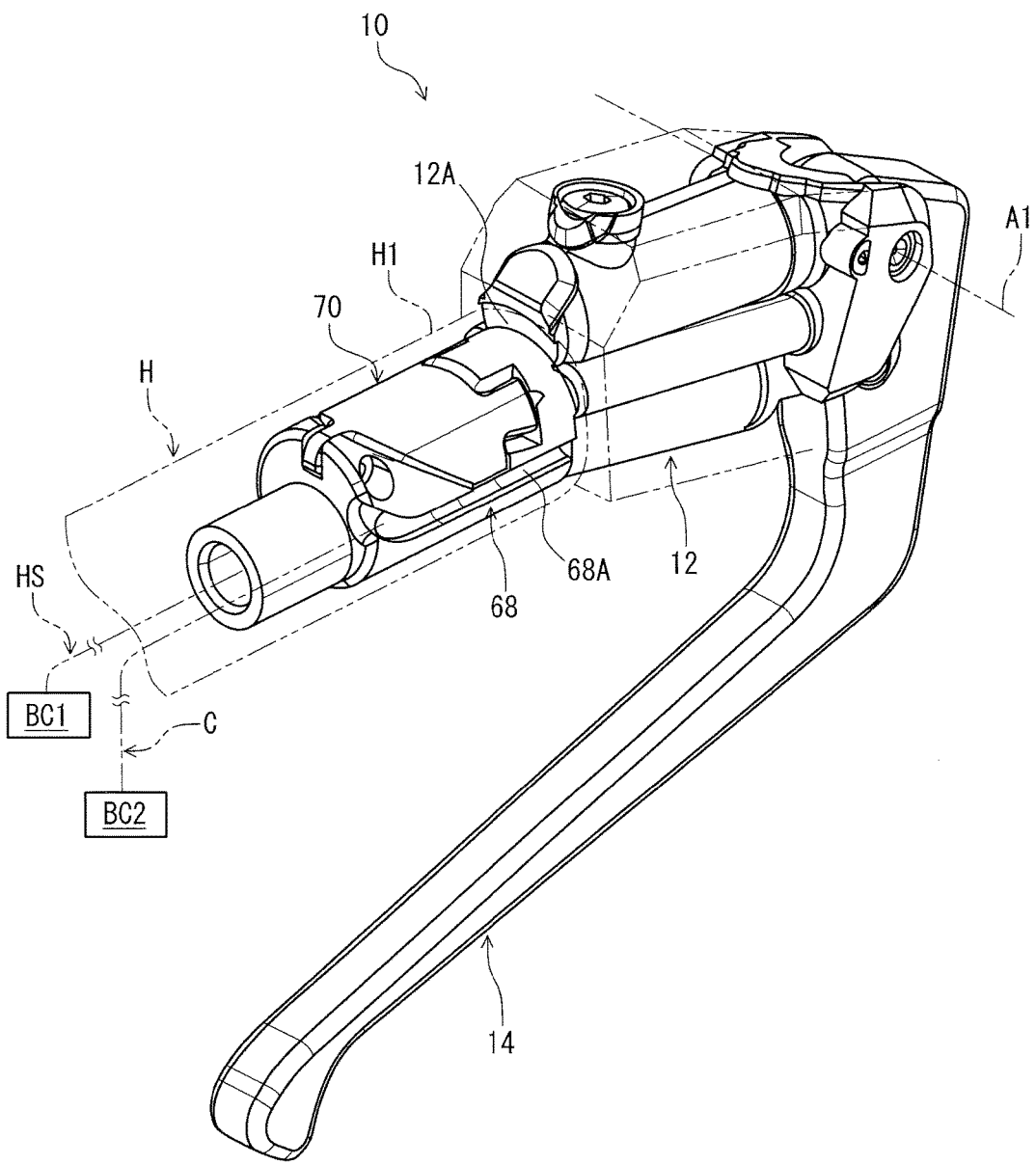
FIG. 2 is another perspective view of the bicycle operating device illustrated in FIG. 1.

Referring initially to FIGS. 1 and 2, a bicycle operating device 10 or a bicycle component mounting device 10 in accordance with an embodiment is configured to be mounted to a bicycle handlebar H such as a time trial handlebar, a bull horn handlebar, and a flat handlebar. However, the bicycle operating device 10 (the bicycle component mounting device 10) can be mounted to other type of handlebars if needed and/or desired.

The bicycle operating device 10 is configured to be operated by a user (e.g., a rider) to actuate a bicycle component BC1 such as a hydraulic brake device. The bicycle operating device 10 is connected to the bicycle component BC1 via a hydraulic hose HS. In the illustrated embodiment, the bicycle operating device 10 is a right-hand side control device configured to be operated by the rider's right hand to actuate the bicycle component BC1. However, the construction of the bicycle operating device 10 can be applied to a left-hand side control device if needed and/or desired.

In the present application, the following directional terms "front", "rear", "forward", "rearward", "left", "right", "transverse", "upward" and "downward" as well as any other similar directional terms refer to those directions which are determined on the basis of the user (e.g., the rider) who sits on a saddle (not shown) of a bicycle with facing the bicycle handlebar H. Accordingly, these terms, as utilized to describe the bicycle operating device 10 or the bicycle component mounting device 10, should be interpreted relative to the bicycle equipped with the bicycle operating device 10 or the bicycle component mounting device 10 as used in an upright riding position on a horizontal surface.

Figure 3:
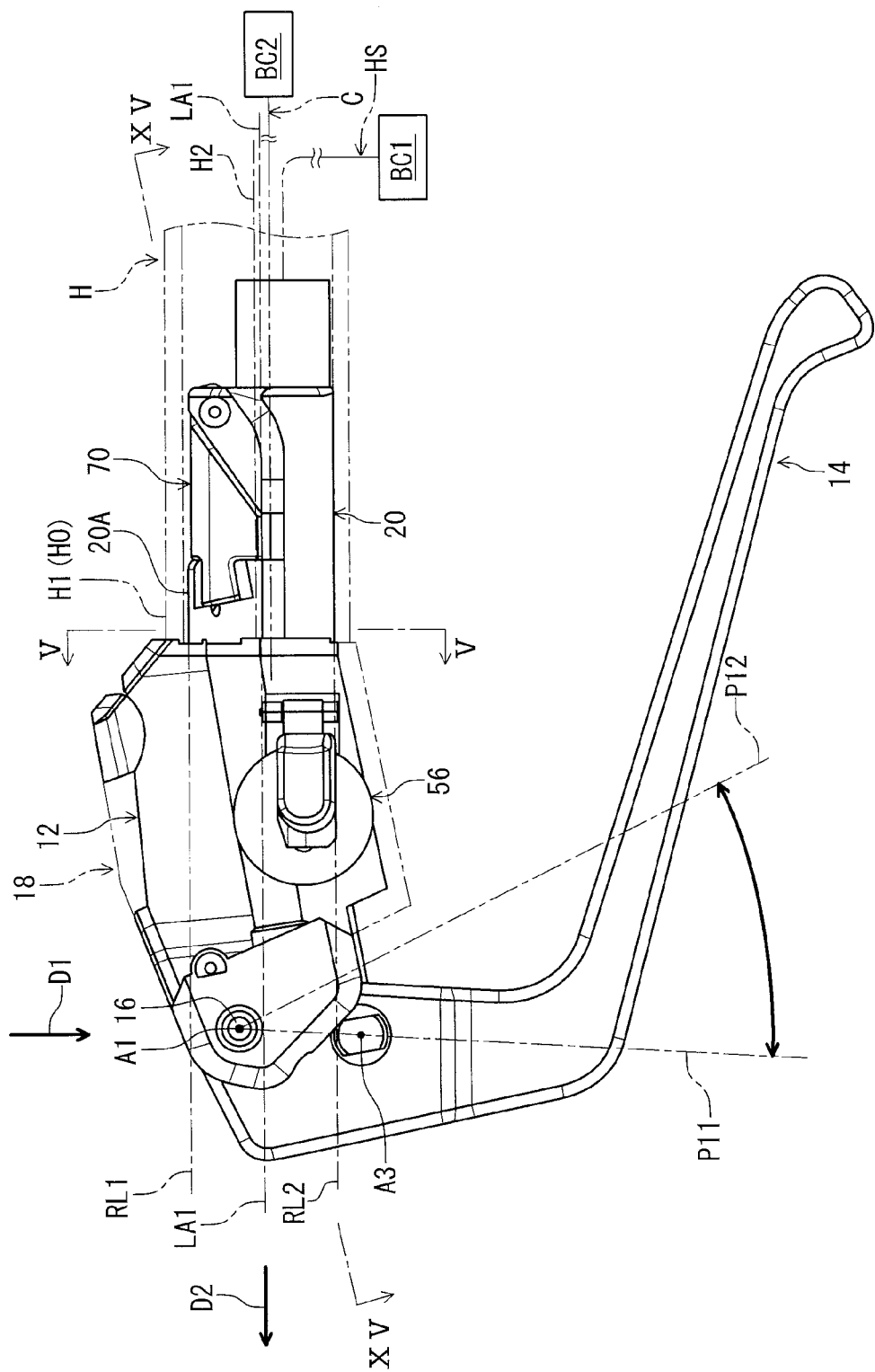
FIG. 3 is a side elevational view of the bicycle operating device illustrated in FIG. 1.
Figure 4:
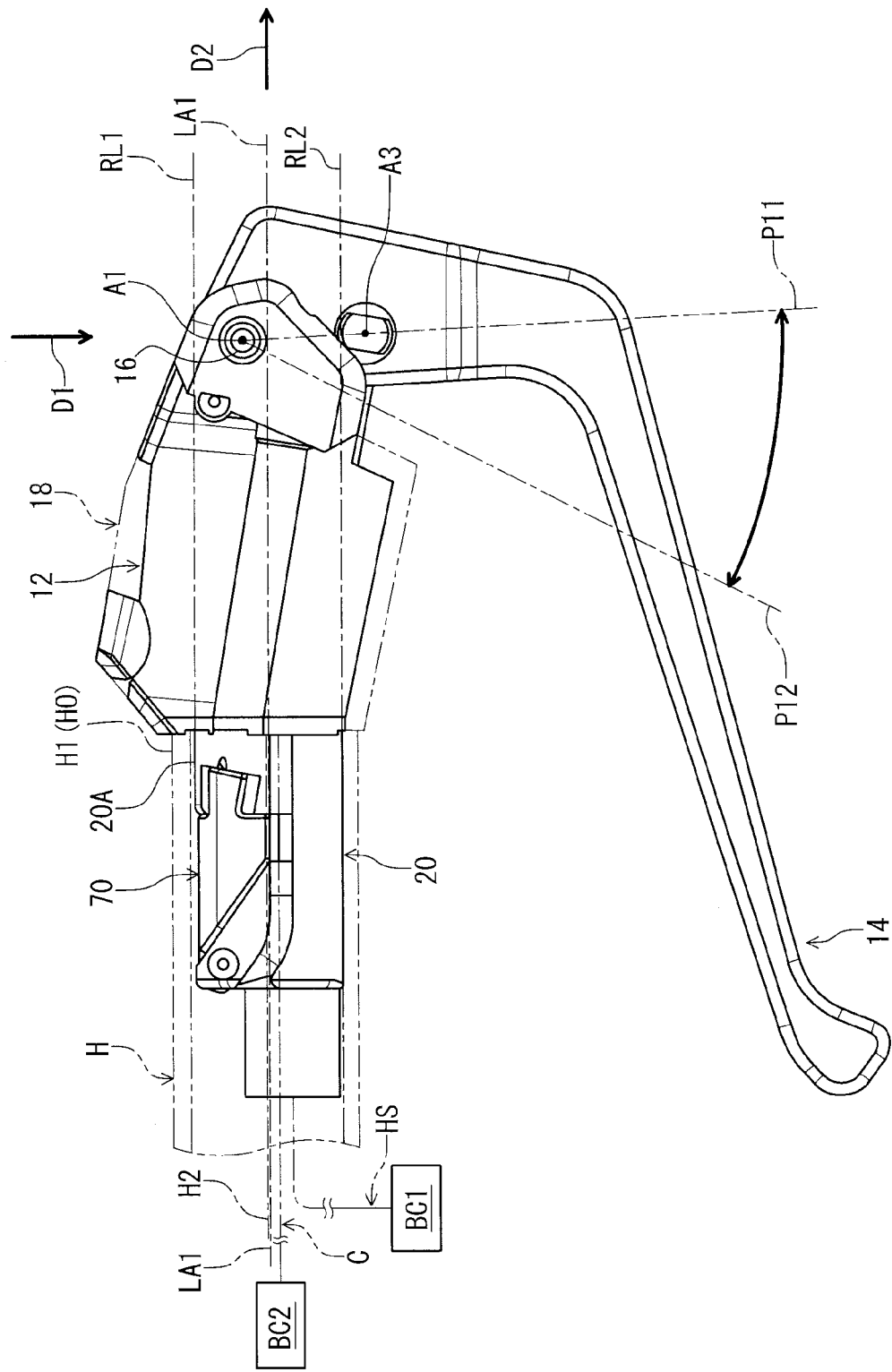
FIG. 4 is another side elevational view of the bicycle operating device illustrated in FIG. 1.

As seen in FIGS. 3 and 4, the bicycle operating device (the bicycle component mounting device) 10 comprises a base member 12 and an operating member 14. The base member 12 is configured to be mounted to a free end H1 of the bicycle handlebar H. The base member 12 has a longitudinal axis LA1 defined along a center axis H2 of the free end H1 of the bicycle handlebar H in a mounting state where the base member 12 is mounted to the free end H1 of the bicycle handlebar H.

In this embodiment, the longitudinal axis LA1 of the base member 12 is offset from the center axis H2 of the free end H1 of the bicycle handlebar H. However, the longitudinal axis LA1 can coincide with the center axis H2. The longitudinal axis LA1 can be inclined relative to the center axis H2. The longitudinal axis LA1 is preferably parallel to the center axis H2.

The base member 12 includes a bar-end contact surface 12A (FIG. 2) configured to contact an end surface of the free end H1 of the bicycle handlebar H in the mounting state. However, the bar-end contact surface 12A can be omitted from the base member 12.

The operating member 14 is pivotally coupled to the base member 12 about a pivot axis A1. The operating member 14 is pivotally mounted to the base member 12 to operate the bicycle component BC1. The bicycle operating device 10 comprises a pivot pin 16 defining the pivot axis A1. The pivot pin 16 pivotally couples the operating member 14 to the base member 12 about the pivot axis A1. The operating member 14 is pivotable relative to the base member 12 about the pivot axis A1 between a rest position P11 and an operated position P12.

In the present application, the term "rest position" as used herein refers to a position at which a movable part such as the operating member 14 remains stationary in a state where the movable part is not operated by the user. The term "operated position" as used herein refers to a position at which the movable part has been operated by the user to perform the operation of a bicycle component such as the bicycle component BC1.

The bicycle operating device 10 comprises a cover 18 attached to the base member 12 to at least partly cover the base member 12. The cover 18 is a separate member from the base member 12. The cover 18 can be omitted from the bicycle operating device 10 or can be integrally provided with the base member 12 as a one-piece unitary member.

As seen in FIGS. 3 and 4, the base member 12 includes a mounting portion 20 configured to be mounted within an interior of the free end H1 of the bicycle handlebar H in the mounting state where the base member 12 is mounted to the free end H1 of the bicycle handlebar H. The mounting portion 20 has the longitudinal axis LA1 defined along the center axis H2 of the free end H1 of the bicycle handlebar H in the mounting state.

Figure 5:
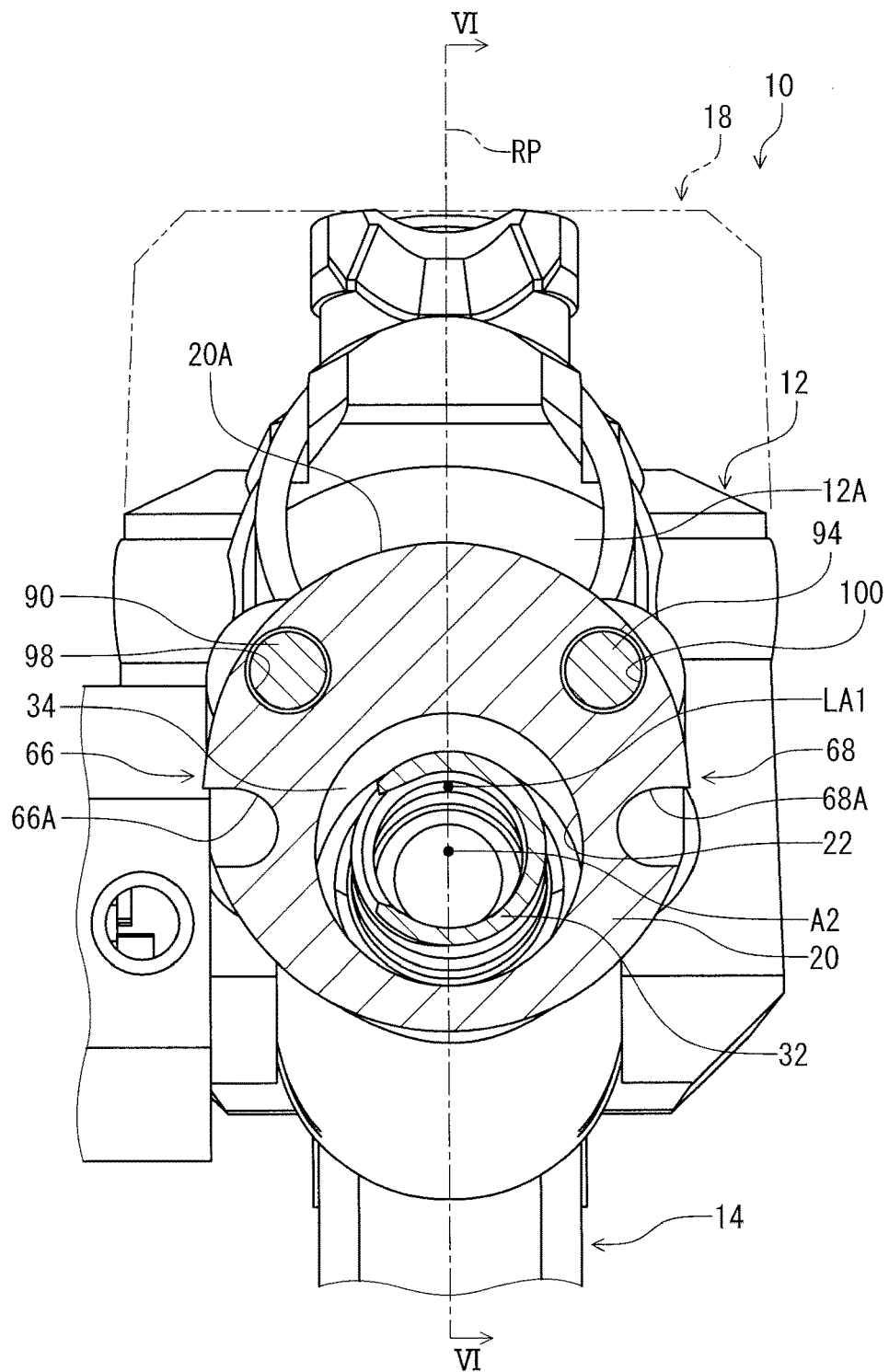
FIG. 5 is a cross-sectional view of the bicycle operating device taken along line V-V of FIG. 3.

As seen in FIG. 5, the mounting portion 20 includes an outer circumferential surface 20A having a center of curvature. In this embodiment, the outer circumferential surface 20A defines a substantially circular outline in a cross-section taken along a plane perpendicular to the longitudinal axis LA1. The longitudinal axis LA1 is defined to extend through the center of curvature of the outer circumferential surface 20A.

The cylinder center axis A2 and the longitudinal axis LA1 of the base member 12 define a reference plane RP. The pivot axis A1 is perpendicular to the reference plane RP. The base member 12 has a symmetrical shape relative to the reference plane RP. However, the pivot axis A1 can be non-parallel to the reference plane RP. The base member 12 can have an asymmetrical shape relative to the reference plane RP.

As seen in FIG. 3, the pivot axis A1 is closer to the longitudinal axis LA1 than an outer circumferential surface HO of the free end H1 of the bicycle handlebar H in a direction D1 perpendicular to the longitudinal axis LH1 in the mounting state. Preferably, the pivot axis A1 is closer to the longitudinal axis LA1 than the outer circumferential surface 20A of the mounting portion 20 in the direction D1 perpendicular to the longitudinal axis LA1. Specifically, the outer circumferential surface 20A defines a first reference line RL1 and a second reference line RL2. The pivot axis A1 is closer to the longitudinal axis LA1 than the first reference line RL1 and the second reference line RL2 as viewed along the pivot axis A1. The pivot axis A1 is provided between the first reference line RL1 and the second reference line RL2 as viewed along the pivot axis A1. However, the pivot axis A1 can be farther from the longitudinal axis LA1 than the outer circumferential surface 20A of the mounting portion 20 in the direction perpendicular to the longitudinal axis LA1.

Figure 6:
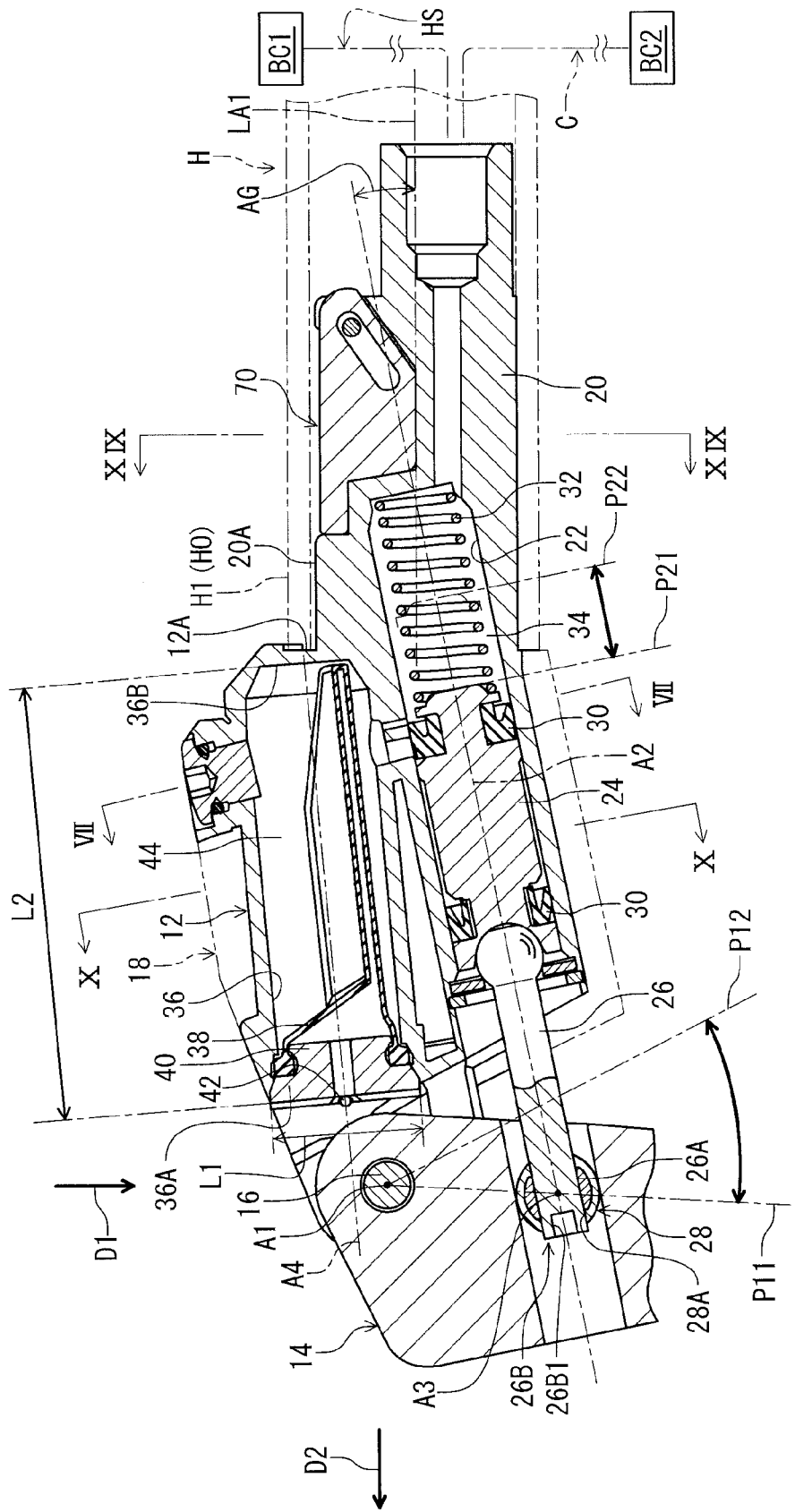
FIG. 6 is a cross-sectional view of the bicycle operating device taken along line VI-VI of FIG. 5.

As seen in FIG. 6, the base member 12 includes a cylinder bore 22 having a cylinder center axis A2. The cylinder bore 22 extends along the cylinder center axis A2. The cylinder bore 22 is at least partly arranged in the bicycle handlebar H in the mounting state. The cylinder bore 22 is at least partly arranged in the mounting portion 20. In this embodiment, the cylinder bore 22 is partly provided in the bicycle handlebar H in the mounting state. The cylinder bore 22 is partly arranged in the mounting portion 20. However, the cylinder bore 22 can be entirely provided in the bicycle handlebar H in the mounting state.

Figure 7:
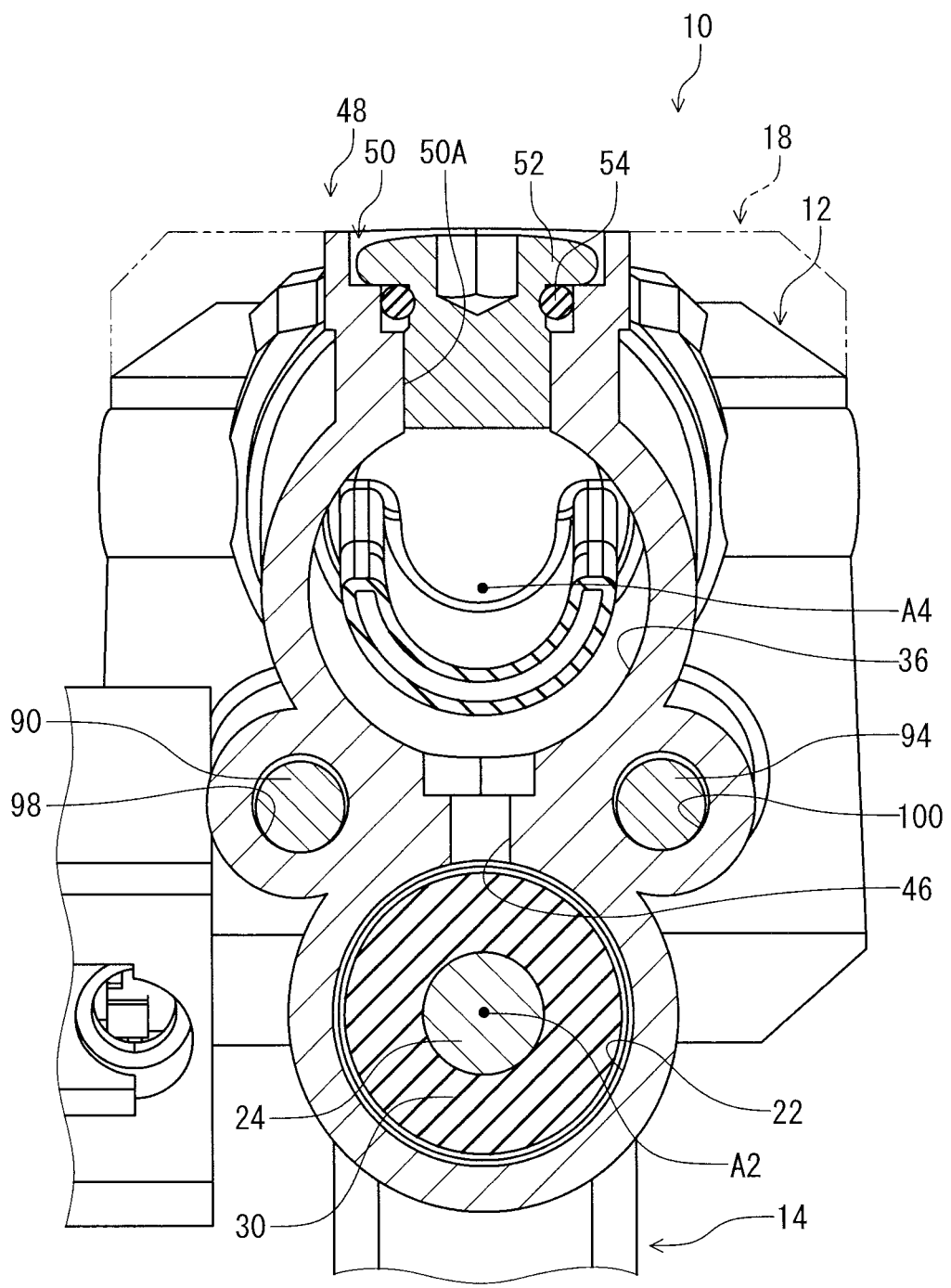
FIG. 7 is a cross-sectional view of the bicycle operating device taken along line VII-VII of FIG. 6.

As seen in FIG. 7, the cylinder bore 22 has a circular cross-section. The cylinder center axis A2 is defined to extend through a center of the circular cross-section of the cylinder bore 22. However, the shape of the cylinder bore 22 is not limited to this embodiment.

Figure 8:
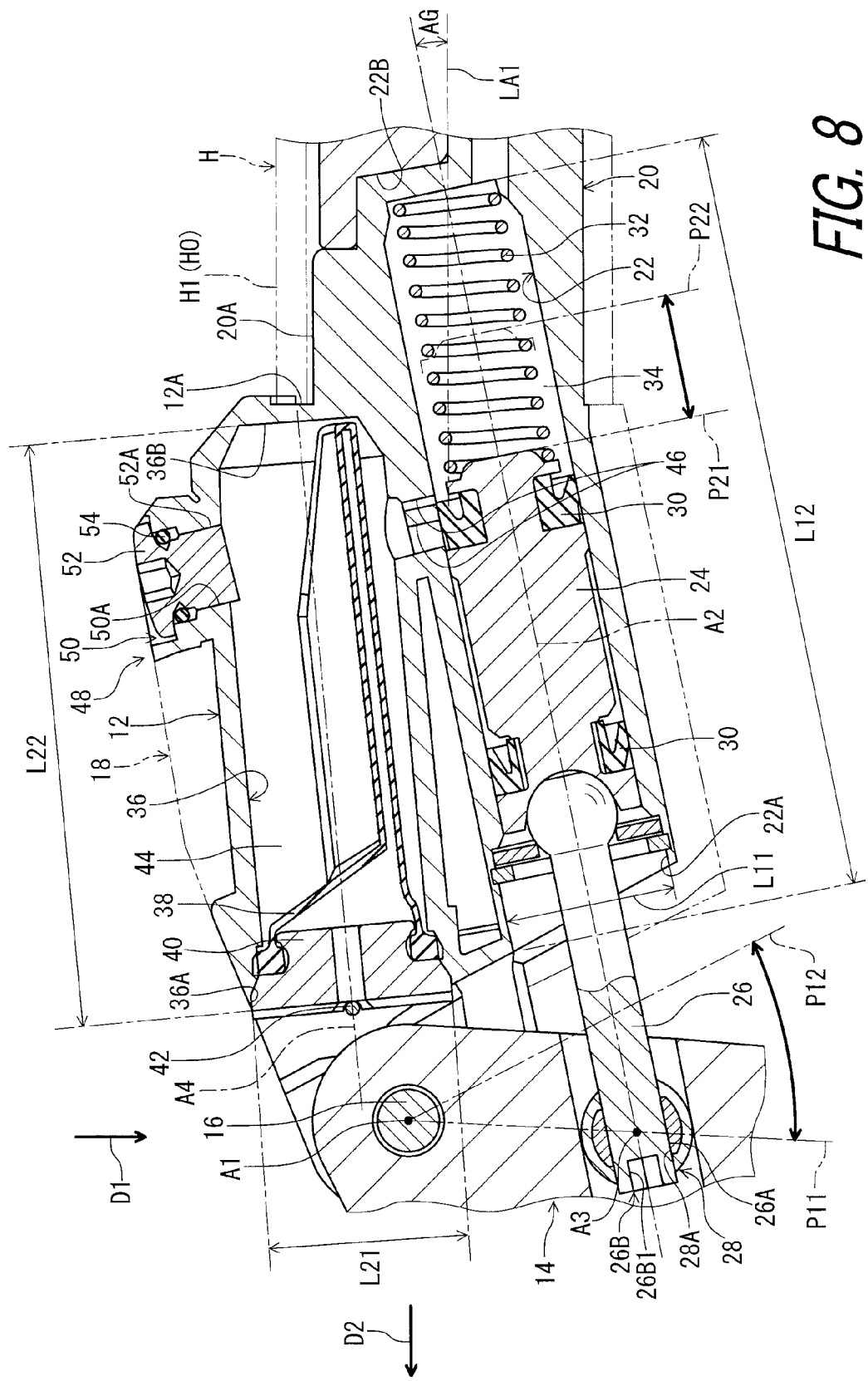
FIG. 8 is a partial cross-sectional view of the bicycle operating device illustrated in FIG. 6.
Figure 9:
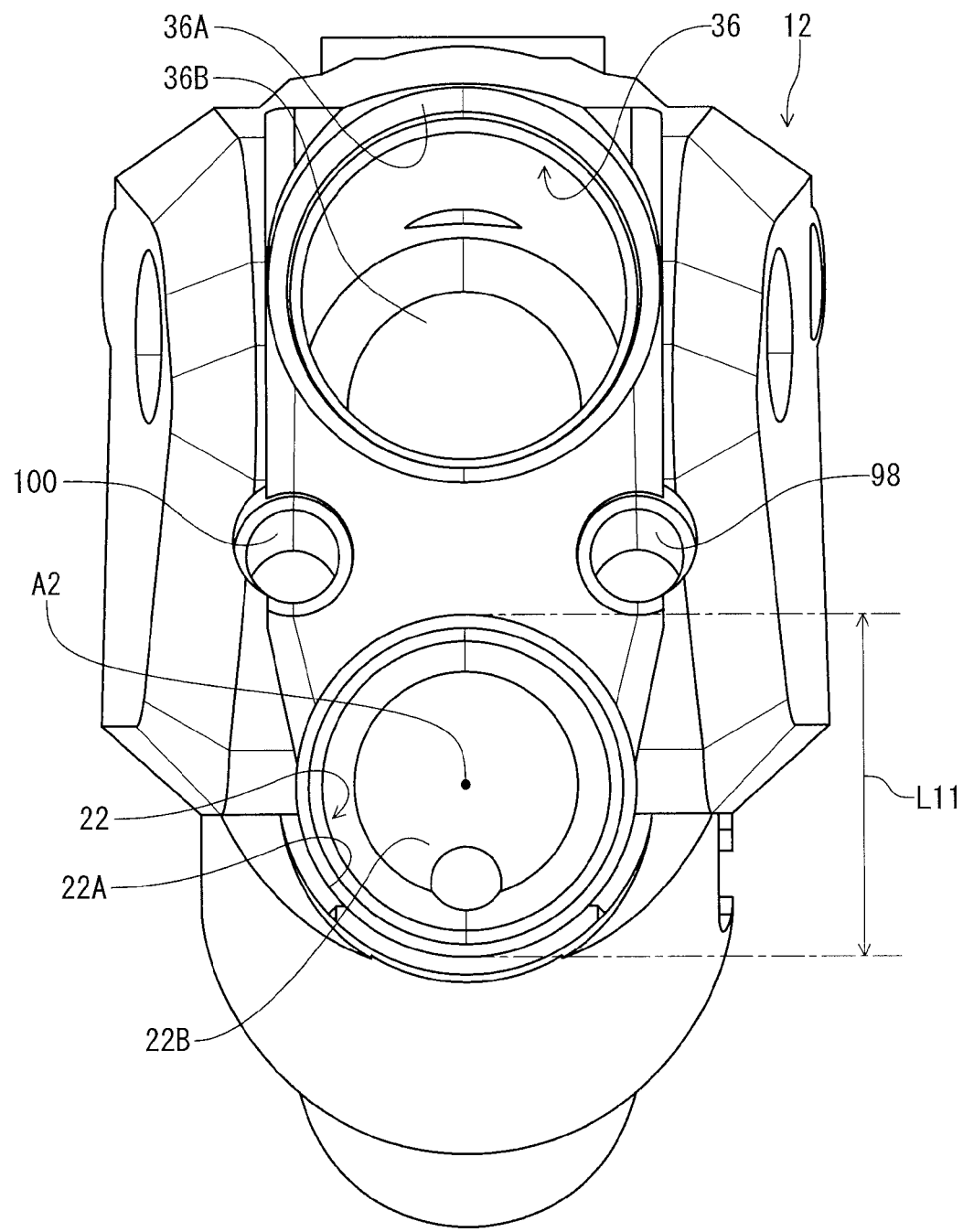
FIG. 9 is a front view of a base member of the bicycle operating device illustrated in FIG. 1.

As seen in FIG. 8, the cylinder bore 22 includes an end opening 22A and a cylinder closed end 22B. The cylinder bore 22 extends between the end opening 22A and the cylinder closed end 22B along the cylinder center axis A2. The end opening 22A has a maximum width L11. The cylinder bore 22 has a maximum depth L12. The maximum depth L12 is defined between the end opening 22A and the cylinder closed end 22B along the cylinder center axis A2. The maximum depth L12 is larger than the maximum width L11. However, the maximum depth L12 of the cylinder bore 22 is equal to or smaller than the maximum width L11 of the end opening 22A. As seen in FIG. 9, the end opening 22A has a circular shape. The maximum width L11 is defined as a maximum inner diameter of the end opening 22A.

As seen in FIG. 8, the cylinder center axis A2 is inclined relative to the longitudinal axis LA1. The cylinder center axis A2 is inclined relative to the longitudinal axis LA1 by an inclination angle AG equal to or larger than 4 degrees. In this embodiment, the cylinder center axis A2 is inclined relative to the longitudinal axis LA1 as viewed along the pivot axis A1. Specifically, the cylinder center axis A2 is downwardly inclined in a reference direction D2 in the mounting state. The reference direction D2 is defined to be parallel to the longitudinal axis LA1 and to be directed from the free end H1 of the bicycle handlebar H toward the pivot axis A1. The cylinder center axis A2 is inclined relative to the longitudinal axis LA1 by the inclination angle AG equal to or larger than 4 degrees as viewed along the pivot axis A1. However, the cylinder center axis A2 can be parallel to the longitudinal axis LA1 as viewed along the pivot axis A1. The inclination angle AG of the cylinder center axis A2 can be smaller than 4 degrees as viewed along the pivot axis A1. The inclination angle AG is equal to or larger than 10 degrees. The inclination angle AG is equal to or smaller than 60 degrees. The inclination angle AG is more preferably equal to or smaller than 30 degrees.

However, the inclination angle AG is not limited to this embodiment. The inclination angle AG can be equal to or larger than approximately 4 degrees. The inclination angle AG can be equal to or larger than approximately 10 degrees. The inclination angle AG can be equal to or smaller than approximately 60 degrees. The inclination angle AG is more preferably equal to or smaller than approximately 30 degrees.

The cylinder center axis A2 coincides with the longitudinal axis LA1 as viewed in a direction perpendicular to each of the pivot axis A1 and the longitudinal axis LA1 (e.g., as viewed in the direction D1). The cylinder center axis A2 can be offset from the longitudinal axis LA1 as viewed in the direction D1. The cylinder center axis A2 is preferably parallel to the longitudinal axis LA1 as viewed in the direction D1.

The bicycle operating device (the bicycle component mounting device) 10 comprises a piston 24. The piston 24 is movably provided in the cylinder bore 22. The piston 24 is movable relative to the base member 12 between an initial position P21 and an actuated position P22. The initial position P21 corresponds to the rest position P11 of the operating member 14. The actuated position P22 corresponds to the operated position P12 of the operating member 14.

The piston 24 is operatively coupled to the operating member 14 to move in the cylinder bore 22 in response to a pivotal movement of the operating member 14. The bicycle operating device 10 comprises a piston rod 26 and a coupling pin 28. The piston rod 26 operatively couples the operating member 14 to the piston 24 to move the piston 24 in response to the pivotal movement of the operating member 14. The coupling pin 28 is rotatably attached to the operating member 14 about a coupling rotational axis A3. The coupling pin 28 includes a threaded hole 28A. The piston rod 26 includes external threads 26A engaged with the threaded hole 28A. The piston rod 26 includes a tool engagement part 26B configured to be engaged with a tool. The tool engagement part 26B includes a hexagonal hole 26B1 configured to be engaged with the tool such as a hexagonal wrench. Rotation of the piston rod 26 changes the rest position P11 of the operating member 14.

The bicycle operating device 10 comprises piston seal members 30 and a piston biasing member 32. The piston seal members 30 are attached to the piston 24. The cylinder bore 22 and the piston 24 define a hydraulic chamber 34. The piston biasing member 32 is provided in the hydraulic chamber 34 to bias the piston 24 toward the initial position P21. In this embodiment, for example, the piston biasing member 32 includes a coiled spring.

The base member 12 includes a reservoir bore 36 connected to the cylinder bore 22. The reservoir bore 36 has a reservoir center axis A4. The reservoir bore 36 extends along the reservoir center axis A4. The reservoir center axis A4 extends along the cylinder center axis A2. In this embodiment, the reservoir center axis A4 is non-parallel to the cylinder center axis A2. However, the reservoir center axis A4 can be parallel to the cylinder center axis A2.

The reservoir bore 36 is closer to the pivot axis A1 than the cylinder bore 22. The pivot axis A1 is provided between the reservoir center axis A4 and the cylinder center axis A2. The reservoir center axis A4 is closer to the pivot axis A1 than the cylinder center axis A2. However, the positional relationship defined between the reservoir bore 36 and the cylinder bore 22 is not limited to this embodiment. The reservoir bore 36 can be farther from the pivot axis A1 than the cylinder bore 22. The reservoir center axis A4 can be farther from the pivot axis A1 than the cylinder center axis A2.

Figure 10:
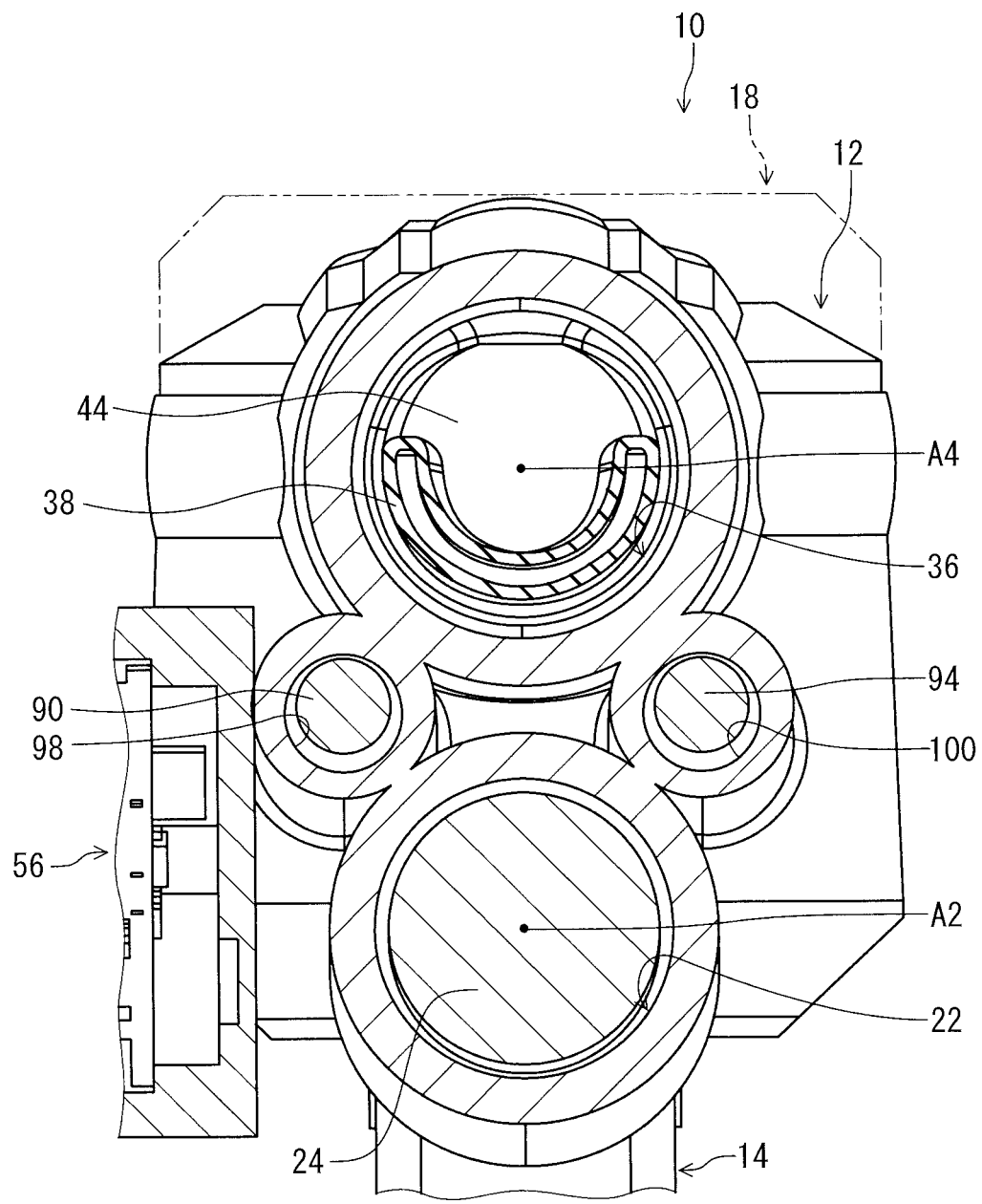
FIG. 10 is a cross-sectional view of the bicycle operating device taken along line X-X of FIG. 6.

As seen in FIG. 10, the reservoir bore 36 has a circular cross-section. The reservoir center axis A4 is defined to extend through a center of the circular cross-section of the reservoir bore 36. However, the shape of the reservoir bore 36 is not limited to this embodiment. The cross-sectional shape of the reservoir bore 36 can include an oval shape and a polygonal shape. The reservoir bore 36 can be omitted from the base member 12.

Figure 11:
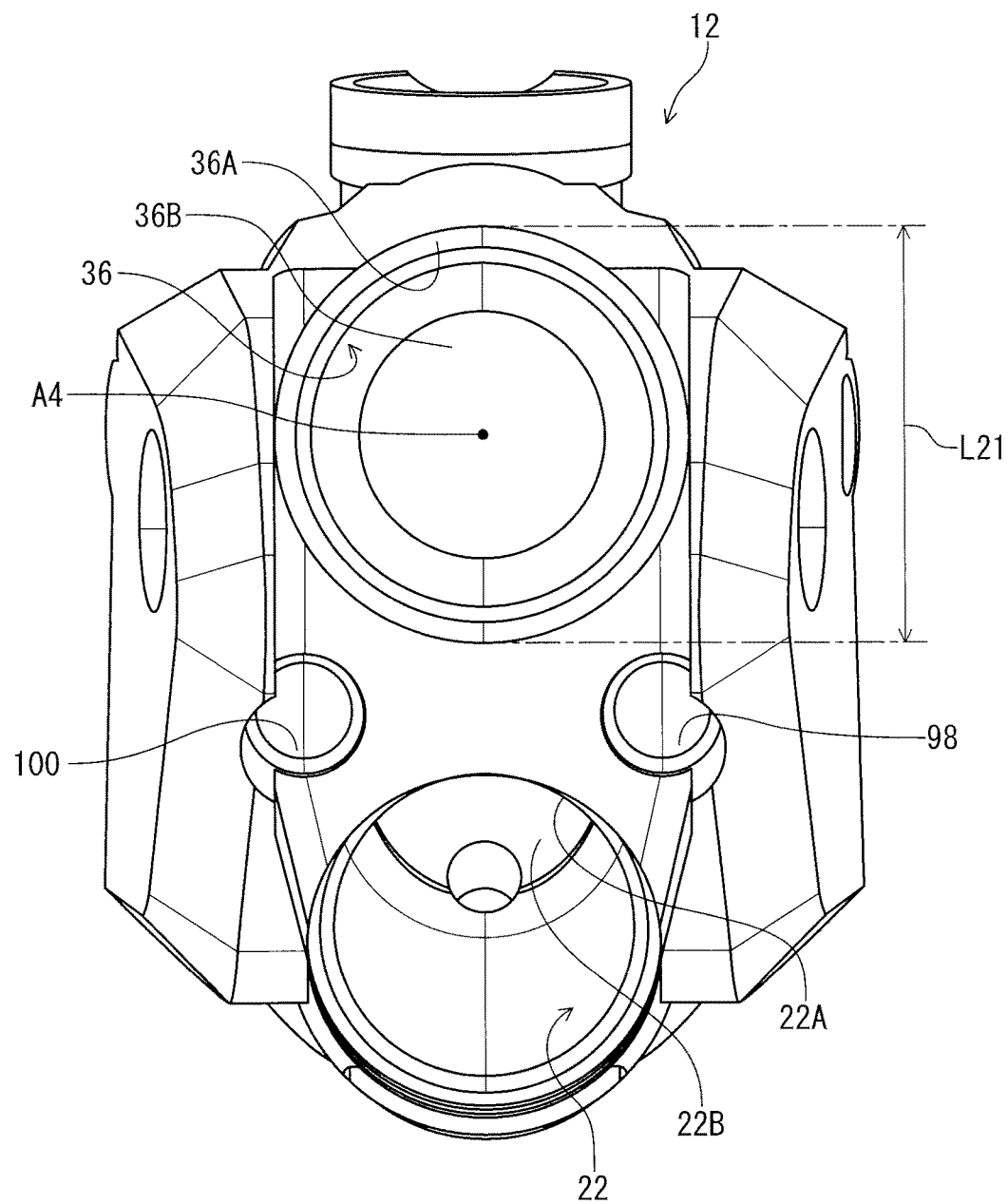
FIG. 11 is another front view of the base member of the bicycle operating device illustrated in FIG. 1.

As seen in FIG. 8, the reservoir bore 36 includes a lid opening 36A and a reservoir closed end 36B. The reservoir bore 36 extends from the lid opening 36A. The reservoir bore 36 extends between the lid opening 36A and the reservoir closed end 36B along the reservoir center axis A4. The lid opening 36A has a maximum width L21. The reservoir bore 36 has a maximum depth L22. The maximum depth L22 is defined between the lid opening 36A and the reservoir closed end 36B along the reservoir center axis A4. The maximum depth L22 is larger than the maximum width L21. However, the maximum depth L22 of the reservoir bore 36 is equal to or smaller than the maximum width L21 of the lid opening 36A. As seen in FIG. 11, the lid opening 36A has a circular shape. The maximum width L21 is defined as a maximum inner diameter of the lid opening 36A.

As seen in FIG. 8, the bicycle operating device 10 comprises a diaphragm 38, a lid 40, and a lid stopper 42. The diaphragm 38 is provided in the reservoir bore 36 and is made of an elastic material such as rubber. The lid 40 is attached to the base member 12 to cover the lid opening 36A. The lid stopper 42 is secured to the base member 12 to prevent the lid 40 from being removed from the lid opening 36A. The lid stopper 42 includes a rod, for example. The reservoir bore 36 and the diaphragm 38 define a reservoir chamber 44. The reservoir chamber 44 is connected to the hydraulic chamber 34 via connection holes 46.

The base member 12 includes a bleeding port 48 to bleed a hydraulic fluid from the reservoir bore 36. The bleeding port 48 includes a bleeding hole 50, a bleeding plug 52, and a seal ring 54. The bleeding hole 50 extends from the reservoir bore 36 to an outside of the base member 12. The bleeding plug 52 is detachably attached to the bleeding hole 50. The seal ring 54 is attached to the bleeding plug 52. In this embodiment, the bleeding hole 50 includes a threaded hole 50A. The bleeding plug 52 includes external threads 52A engaged with the threaded hole 50A. However, the bleeding port 48 can be omitted from the base member 12.

The term "detachably attached" or "detachably attaching", as used herein, encompasses configurations in which an element directly secured to another element by directly affixing the element to the other element while the element is detachable from the other element without substantial damage; and configurations in which the element is indirectly secured to the other element via intermediate member(s) while the element is detachable from the other element and the intermediate member(s) without substantial damage. This concept also applies to words of similar meaning, for example, "detachably secured", "detachably joined", "detachably connected", "detachably coupled", "detachably mounted", "detachably bonded", "detachably fixed" and their derivatives.

The pivot axis A1 is closer to the longitudinal axis LA1 of the base member 12 than the bleeding port 48 in the direction perpendicular to the longitudinal axis LA1. However, the arrangement of the pivot axis A1 is not limited to this embodiment. In this embodiment, the reservoir bore 36 is provided between the bleeding port 48 and the cylinder bore 22.

Figure 12:
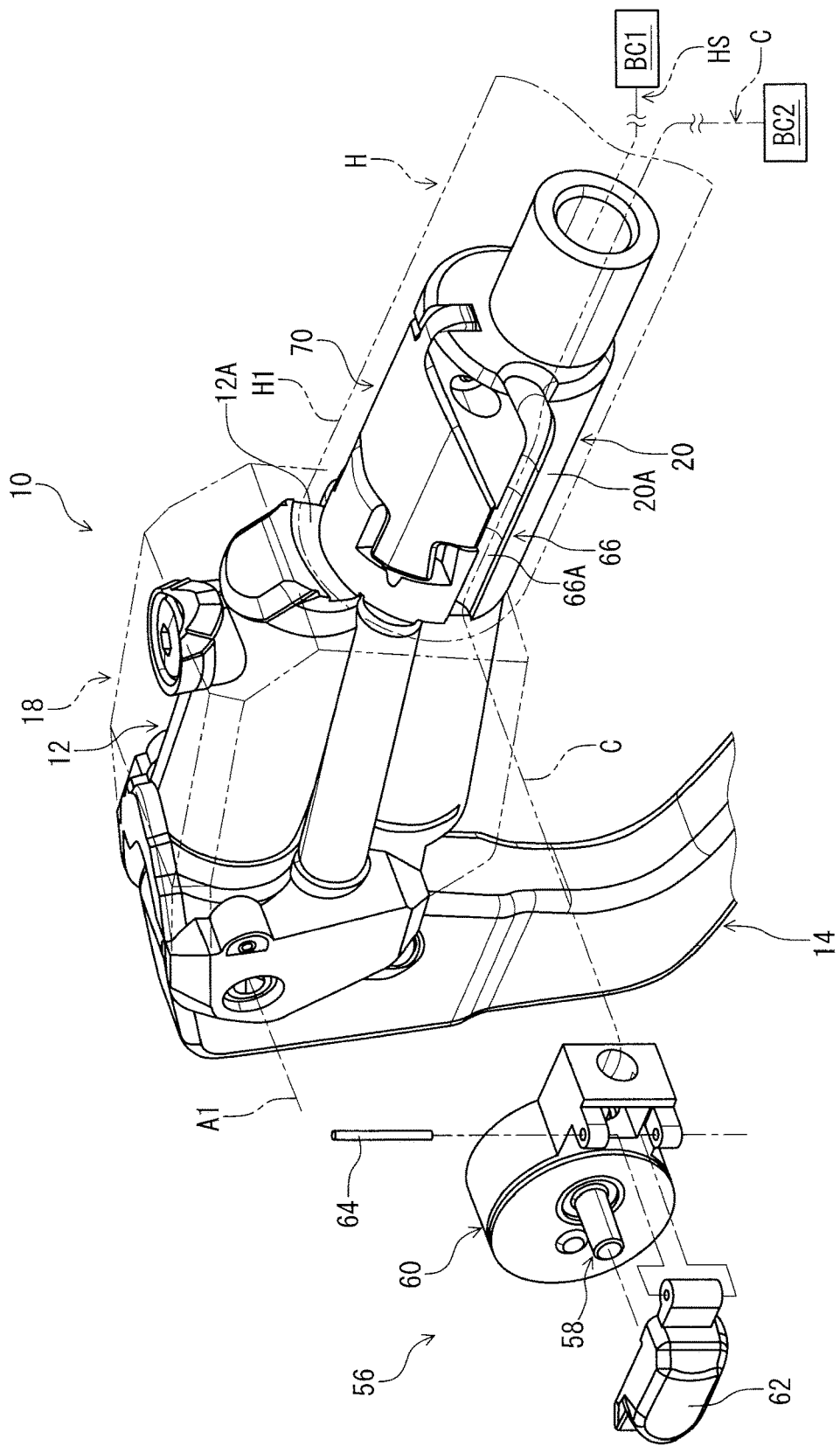
FIG. 12 is an exploded perspective view of the bicycle operating device illustrated in FIG. 1.

As seen in FIG. 12, the bicycle operating device 10 further comprises an additional operating member 56 attached to the base member 12 to operate an additional bicycle component BC2. However, the additional operating member 56 can be omitted from the bicycle operating device 10. In this embodiment, the additional operating member 56 is attached to the cover 18. However, the additional operating member 56 can be directly attached to the base member 12.

The additional operating member 56 includes an electrical switch 58 configured to receive a user input to operate the additional bicycle component BC2. Namely, the bicycle component mounting device 10 further comprises the electrical switch 58 attached to the base member 12 to receive the user input. However, the electrical switch 58 can be omitted from the additional operating member 56. In this embodiment, the electrical switch 58 is an electrical pushbutton switch such as a normally open switch. However, the electrical switch 58 can have another configuration.

The additional operating member 56 includes a switch housing 60, an operating part 62, and a pin 64. The switch housing 60 is secured to the cover 18. The electrical switch 58 is attached to the switch housing 60. The operating part 62 is pivotally coupled to the switch housing 60 via the pin 64. The operating part 62 is pressed by the user. The electrical switch 58 is electrically connected to the additional bicycle component BC2 via a control cable C. However, the electrical switch 58 can be wirelessly connected to the additional bicycle component BC2. The additional operating member 56 can be a mechanical operating member configured to pull and release an inner wire of a mechanical control cable such as a Bowden cable.

The base member 12 includes a cable guide portion 66 configured to guide the control cable C such that the control cable C is unexposed to an outside of the bicycle handlebar H in the mounting state. The cable guide portion 66 is at least partly provided on the mounting portion 20. In this embodiment, the cable guide portion 66 is entirely provided on the mounting portion 20. The cable guide portion 66 includes a cable guide groove 66A provided on the outer circumferential surface 20A of the mounting portion 20. The cable guide groove 66A extends along the longitudinal axis LA1 of the base member 12. However, the cable guide portion 66 can be provided at a position other than the mounting portion 20. The cable guide portion 66 can be omitted from the base member 12.

As seen in FIG. 2, the base member 12 includes an additional cable guide portion 68 configured to guide the control cable C such that the control cable C is unexposed to an outside of the bicycle handlebar H in the mounting state. The additional cable guide portion 68 includes an additional cable guide groove 68A provided on the outer circumferential surface 20A of the mounting portion 20. The additional cable guide groove 68A extends along the longitudinal axis LA1 of the base member 12.

As seen in FIG. 5, the additional cable guide portion 68 is provided on a reverse side of the cable guide portion 66 relative to the mounting portion 20. The cable guide portion 66 and the additional cable guide portion 68 have a symmetrical shape relative to the reference plane RP. The control cable C is provided in the additional cable guide groove 68A when the additional operating member 56 is provided on a left side of the base member 12.

Figure 13:
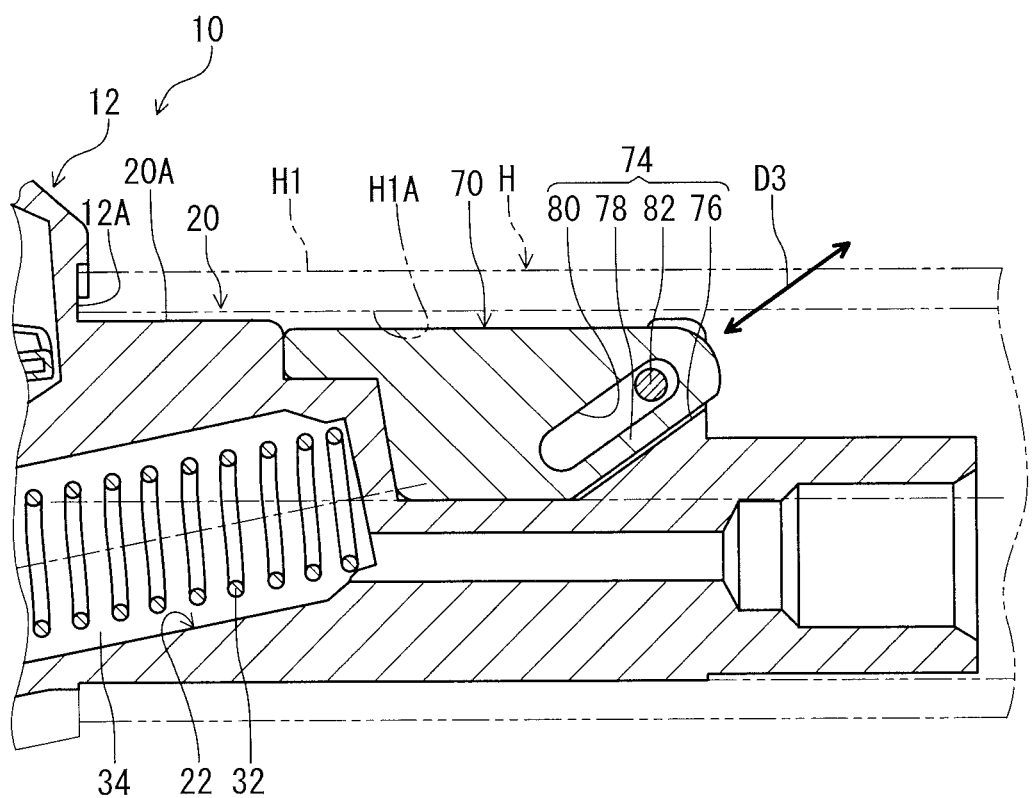
FIG. 13 is a partial enlarged cross-sectional view of the bicycle operating device illustrated in FIG. 6.

As seen in FIGS. 2 and 13, the bicycle component mounting device 10 comprises the base member 12 and a holding member 70. The holding member 70 is configured to be mounted within the interior of the free end H1 of the bicycle handlebar H in the mounting state. The holding member 70 is movably mounted to the mounting portion 20. The holding member 70 is contactable with an inner peripheral surface H1A of the free end H1 of the bicycle handlebar H.

Figure 14:
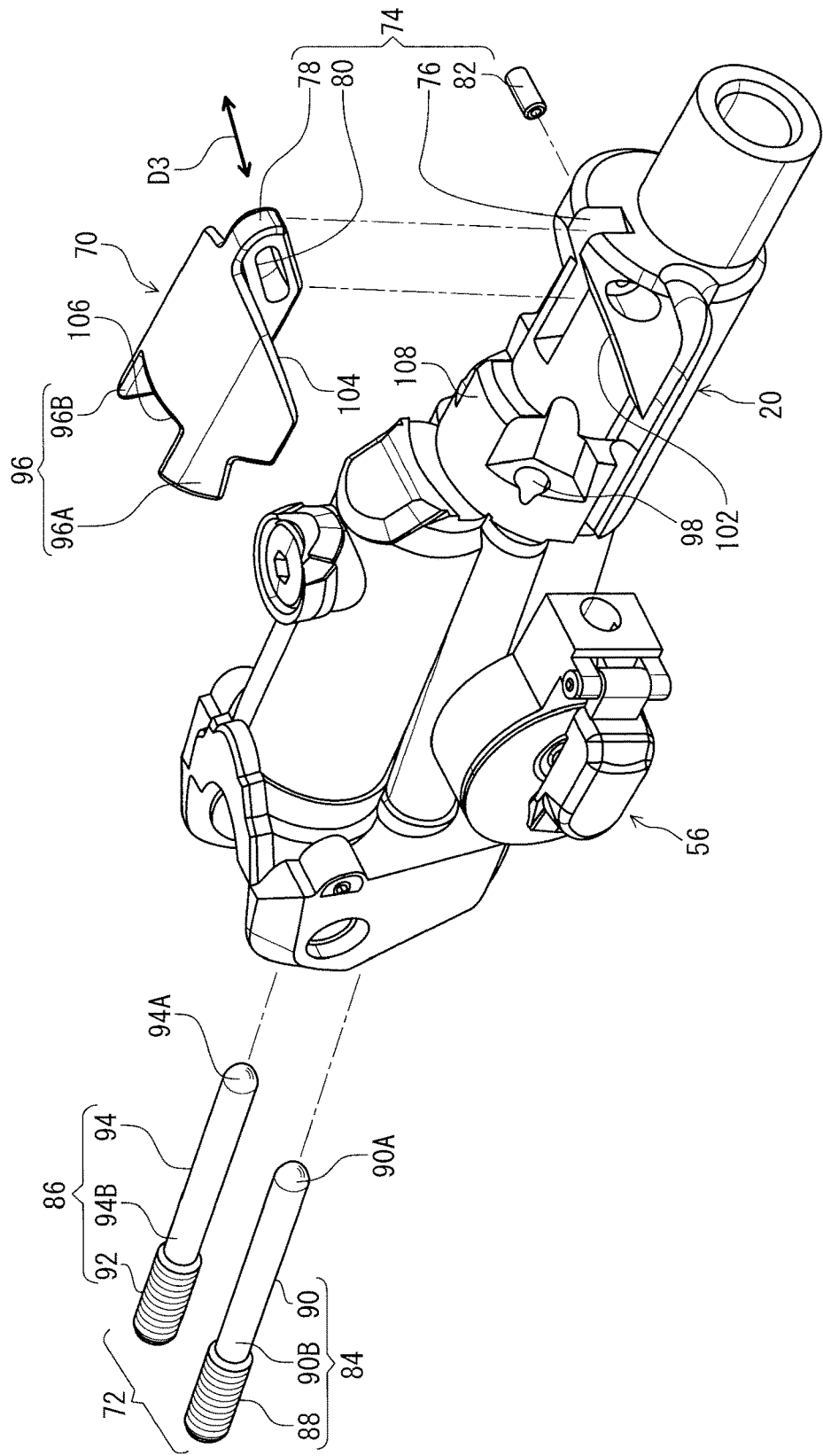
FIG. 14 is an exploded perspective view of the bicycle operating device illustrated in FIG. 1, with an operating member and a cover omitted.

As seen in FIG. 14, the bicycle component mounting device 10 comprises a movable member 72 and a guide structure 74. The movable member 72 is movably mounted relative to the base member 12 to move the holding member 70 relative to the mounting portion 20. In this embodiment, the movable member 72 is movably mounted relative to the base member 12 to push the holding member 70 relative to the mounting portion 20. However, the movable member 72 can be movably mounted relative to the base member 12 to pull the holding member 70 relative to the mounting portion 20. The holding member 70 is pressed against the inner peripheral surface H1A (FIG. 13) of the free end H1 of the bicycle handlebar H when the movable member 72 pushes the holding member 70 relative to the mounting portion 20. Thus, the base member 12 is fixedly mounted to the free end H1 of the bicycle handlebar H.

The guide structure 74 is configured to guide the holding member 70 relative to the mounting portion 20 in a guide direction D3 inclined relative to the longitudinal axis LA1 in response to a movement of the movable member 72. In this embodiment, the guide structure 74 includes a recess 76 and a protrusion 78. The recess 76 is provided at one of the mounting portion 20 and the holding member 70. The protrusion 78 is configured to be disposed in the recess 76 and provided at the other of the mounting portion 20 and the holding member 70. In this embodiment, the recess 76 is provided at the holding member 70. The protrusion 78 is configured to be disposed in the recess 76 and is provided at the mounting portion 20. However, the recess 76 can be provided at the holding member 70. The protrusion 78 can be provided at the mounting portion 20.

The guide structure 74 couples the holding member 70 to the mounting portion 20 to guide the holding member 70 relative to the base member 12 in the guide direction D3 in response to the movement of the movable member 72. In this embodiment, the guide structure 74 includes a guide opening 80 and a guide member 82 provided in the guide opening 80. The guide member 82 is provided at one of the mounting portion 20 and the holding member 70. The guide opening 80 is provided at the other of the mounting portion 20 and the holding member 70. In this embodiment, the guide member 82 is provided at the mounting portion 20. The guide opening 80 is provided at the holding member 70. However, the guide member 82 can be provided at the holding member 70. The guide opening 80 can be provided at the mounting portion 20. The structure of the guide structure 74 is not limited to this embodiment. The guide structure 74 can have another structure instead of or in addition to the guide member 82 and the guide opening 80.

As seen in FIGS. 13 and 14, the guide opening 80 extends along the guide direction D3. The guide member 82 extends along a direction different from the guide direction D3. In this embodiment, the guide member 82 extends along a direction perpendicular to the guide direction D3.

As seen in FIG. 14, the movable member 72 includes a first movable member 84 and a second movable member 86. The first movable member 84 is movably mounted to the base member 12 to push the holding member 70 relative to the base member 12. The second movable member 86 is movably mounted to the base member 12 to push the holding member 70 relative to the base member 12.

The movable member 72 includes a screw 88 and/or 92 and a pushing rod 90 and/or 94. In this embodiment, the first movable member 84 includes a first screw 88 and a first pushing rod 90. The second movable member 86 includes a second screw 92 and a second pushing rod 94. The first screw 88 can also be referred to as the screw 88. The second screw 92 can also be referred to as the screw 92. The first pushing rod 90 can also referred to as the pushing rod 90. The second pushing rod 94 can also referred to as the pushing rod 94.

The screw 88 is movably mounted to the base member 12 to push the holding member 70. The screw 92 is movably mounted to the base member 12 to push the holding member 70. The pushing rod 90 is movably mounted to the base member 12 to push the holding member 70. The pushing rod 94 is movably mounted to the base member 12 to push the holding member 70.

In this embodiment, the screw 88 is a separate member from the pushing rod 90, and the screw 92 is a separate member from the pushing rod 94. However, the screw 88 can be integrally provided with the pushing rod 90 as a one-piece unitary member. The screw 92 can be integrally provided with the pushing rod 94 as a one-piece unitary member.

The pushing rod 90 has a first end 90A and a second end 90B opposite to the first end 90A. The first end 90A has a curved surface contacting the holding member 70. Similarly, the pushing rod 94 has a first end 94A and a second end 94B opposite to the first end 94A. The first end 94A has a curved surface contacting the holding member 70. In this embodiment, the first end 90A has a semispherical surface contacting the holding member 70. The first end 94A has a semispherical surface contacting the holding member 70. However, the shape of the first end 90A and/or 94A is not limited to this embodiment.

Figure 15:
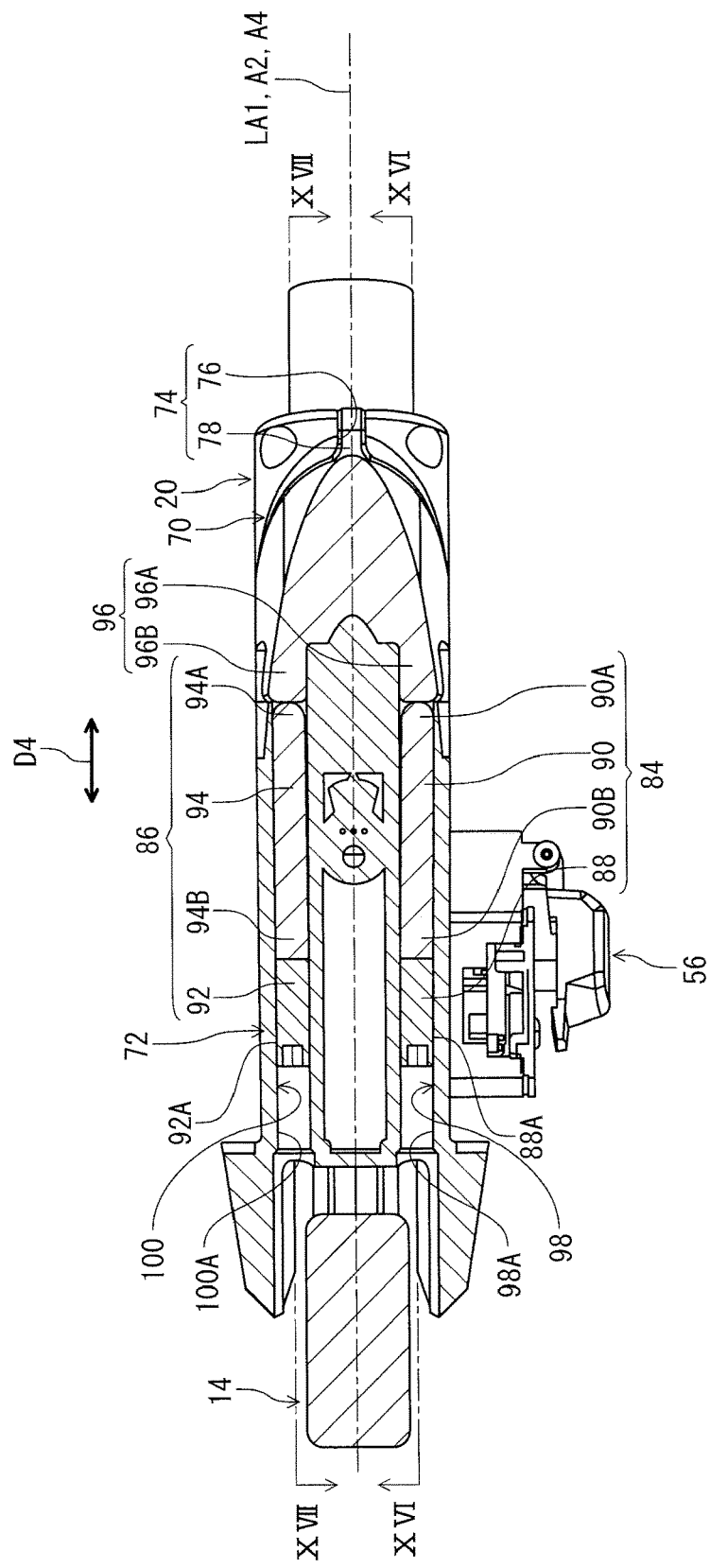
FIG. 15 is a cross-sectional view of the bicycle operating device taken along line XV-XV of FIG. 3.

As seen in FIG. 15, the holding member 70 has a contact part 96 contacting the movable member 72. In this embodiment, the contact part 96 includes a first contact portion 96A and a second contact portion 96B. The first contact portion 96A contacts the first movable member 84. The second contact portion 96B contacts the second movable member 86. Specifically, the first contact portion 96A contacts the first end 90A of the first pushing rod 90. The second contact portion 96B contacts the first end 94A of the second pushing rod 94. However, one of the first movable member 84 and the second movable member 86 can be omitted from the movable member 72.

Figure 16:
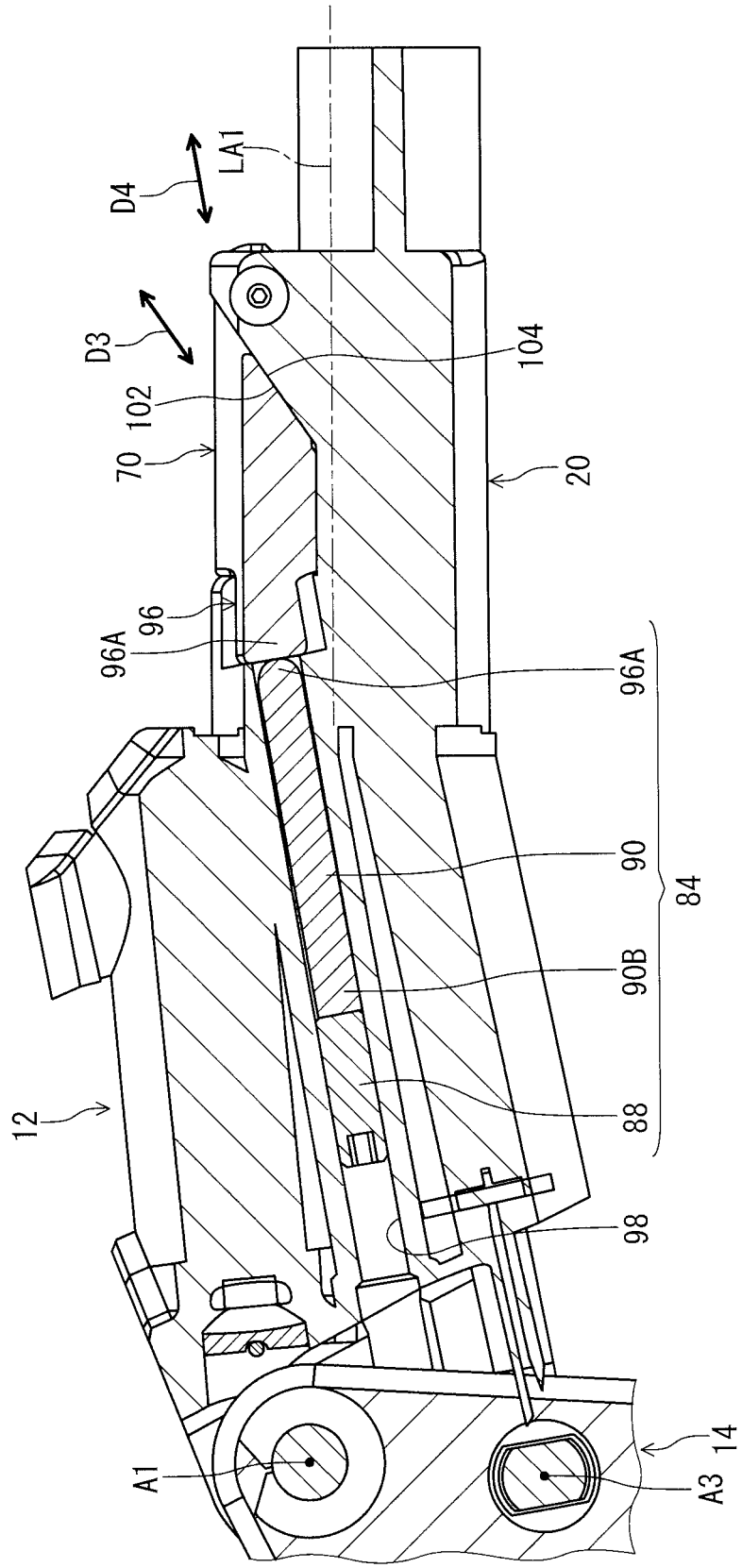
FIG. 16 is a cross-sectional view of the bicycle operating device taken along line XVI-XVI of FIG. 15.
Figure 17:
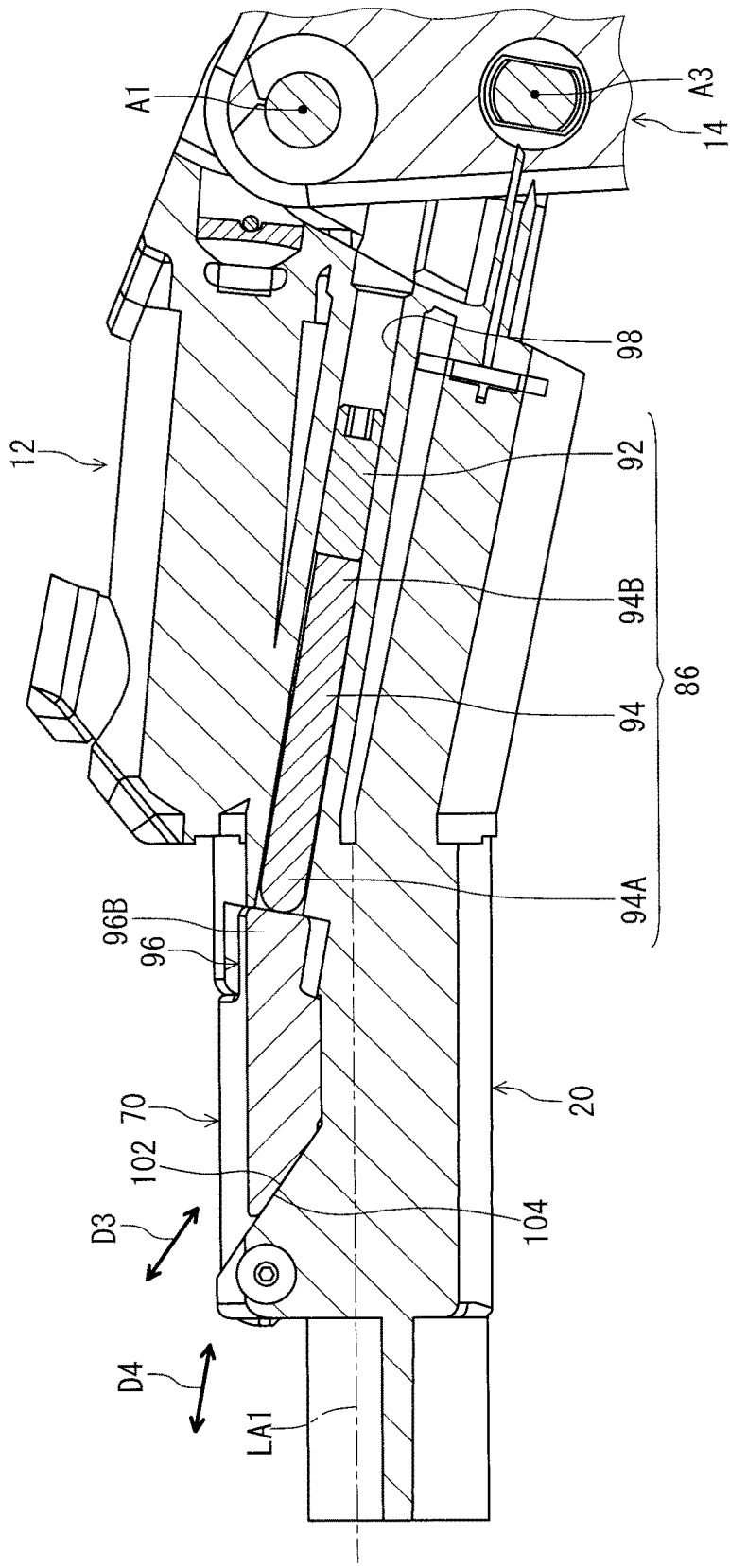
FIG. 17 is a cross-sectional view of the bicycle operating device taken along line XVII-XVII of FIG. 15.

As seen in FIGS. 15 to 17, the base member 12 includes a guide hole 98 and/or 100 extending in a movable direction D4. The piston 24 is movably provided in the cylinder bore in the movable direction D4. In this embodiment, the base member 12 includes a first guide hole 98 and a second guide hole 100. The first guide hole 98 and the second guide hole 100 extend in the movable direction D4. The first guide hole 98 can also be referred to as the guide hole 98. The second guide hole 100 can also be referred to as the guide hole 100.

The movable member 72 is provided in the guide hole 98 and/or 100. The movable member 72 is movable relative to the base member 12 in the movable direction D4. In this embodiment, as seen in FIGS. 15 and 16, the first movable member 84 is provided in the guide hole 98. The first movable member 84 is movable relative to the base member 12 in the movable direction D4. As seen in FIGS. 15 and 17, the second movable member 86 is provided in the guide hole 100. The second movable member 86 is movable relative to the base member 12 in the movable direction D4.

As seen in FIG. 15, the screw 88 includes external threads 88A. The guide hole 98 includes internal threads 98A engaged with the external threads 88A. The screw 88 is threadedly engaged with the guide hole 98 to receive a reaction force from the pushing rod 90. Rotation of the screw 88 changes a position of the holding member 70 relative to the mounting portion 20.

Similarly, the screw 92 includes external threads 92A. The guide hole 100 includes internal threads 100A engaged with the external threads 92A. The screw 92 is threadedly engaged with the guide hole 100 to receive a reaction force from the pushing rod 94. Rotation of the screw 92 changes a position of the holding member 70 relative to the mounting portion 20.

Figure 18:
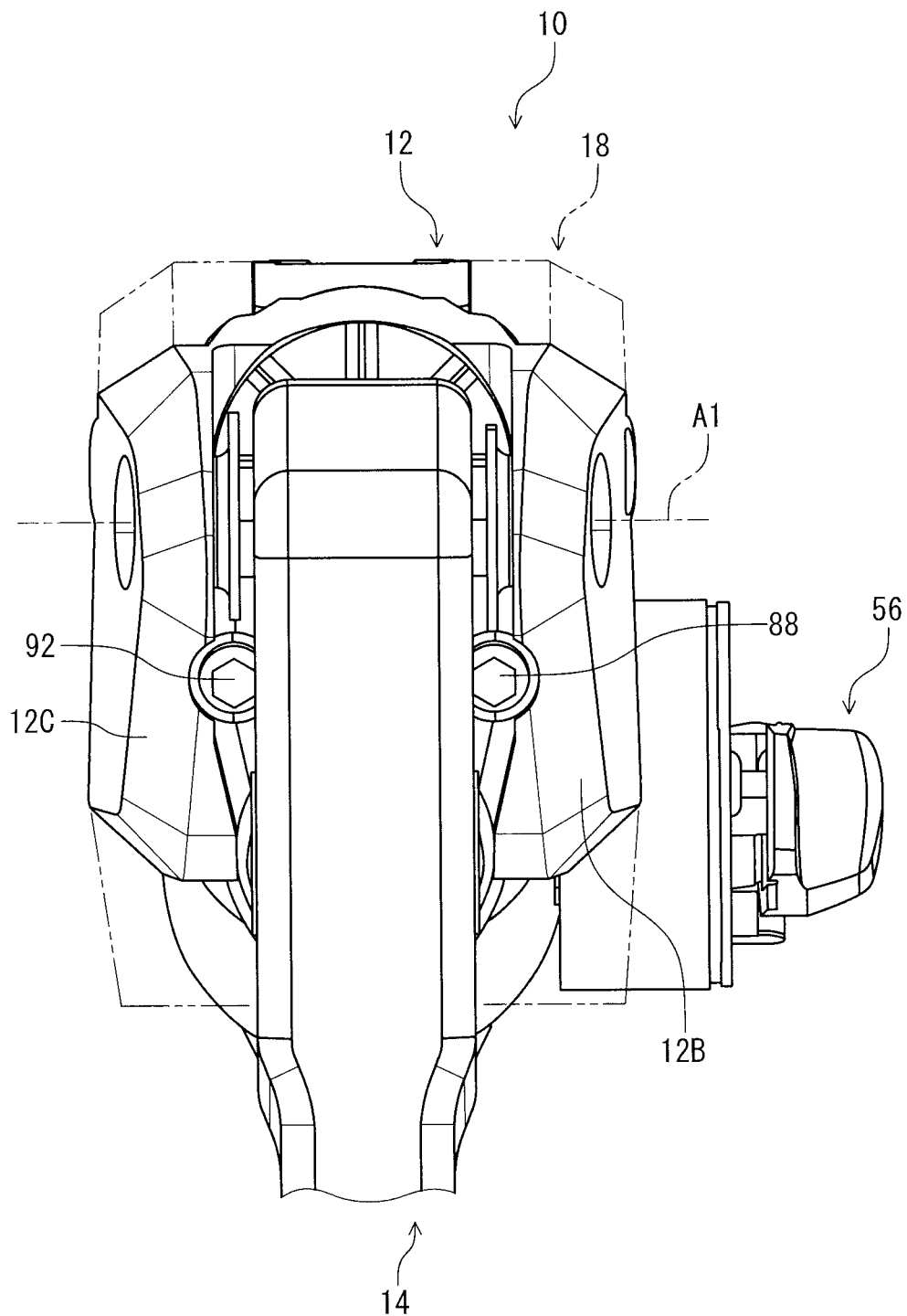
FIG. 18 is a front view of the bicycle operating device illustrated in FIG. 1.

As seen in FIG. 18, the screws 88 and 92 are accessible from an outside of the bicycle operating device 10. In this embodiment, the base member 12 includes a first support 12B and a second support 12C. The operating member 14 is provided between the first support 12B and the second support 12C and is pivotally coupled to the first support 12B and the second support 12C. The screw 88 is accessible via a gap provided between the first support 12B and the operating member 14. The screw 92 is accessible via a gap provided between the second support 12C and the operating member 14.

In this embodiment, as seen in FIGS. 16 and 17, the movable direction D4 is different from the guide direction D3 and is inclined relative to the longitudinal axis LA1. However, the structure of the base member 12 is not limited to this embodiment. The movable direction D4 can be parallel to one of the guide direction D3 and the longitudinal axis LA1.

As seen in FIGS. 16 and 17, the guide structure 74 includes a first inclined surface 102 and a second inclined surface 104. The first inclined surface 102 extends in the guide direction D3. The second inclined surface 104 extends in the guide direction D3. The first inclined surface 102 is provided at the mounting portion 20. The second inclined surface 104 is provided at the holding member 70 to slidably contact the first inclined surface 102.

As seen in FIG. 14, the recess 76 is provided on the first inclined surface 102. The protrusion 78 is provided on the second inclined surface 104. The guide structure 74 includes an additional recess 106 and an additional protrusion 108. The additional protrusion 108 is configured to disposed in the additional recess 106. The additional recess 106 is provided at one of the mounting portion 20 and the holding member 70. The additional protrusion 108 is provided at the other of the mounting portion 20 and the holding member 70. In this embodiment, the additional recess 106 is provided at the holding member 70. The additional protrusion 108 is provided at the mounting portion 20. The additional recess 106 is provided between the first contact portion 96A and the second contact portion 96B.

Figure 19:
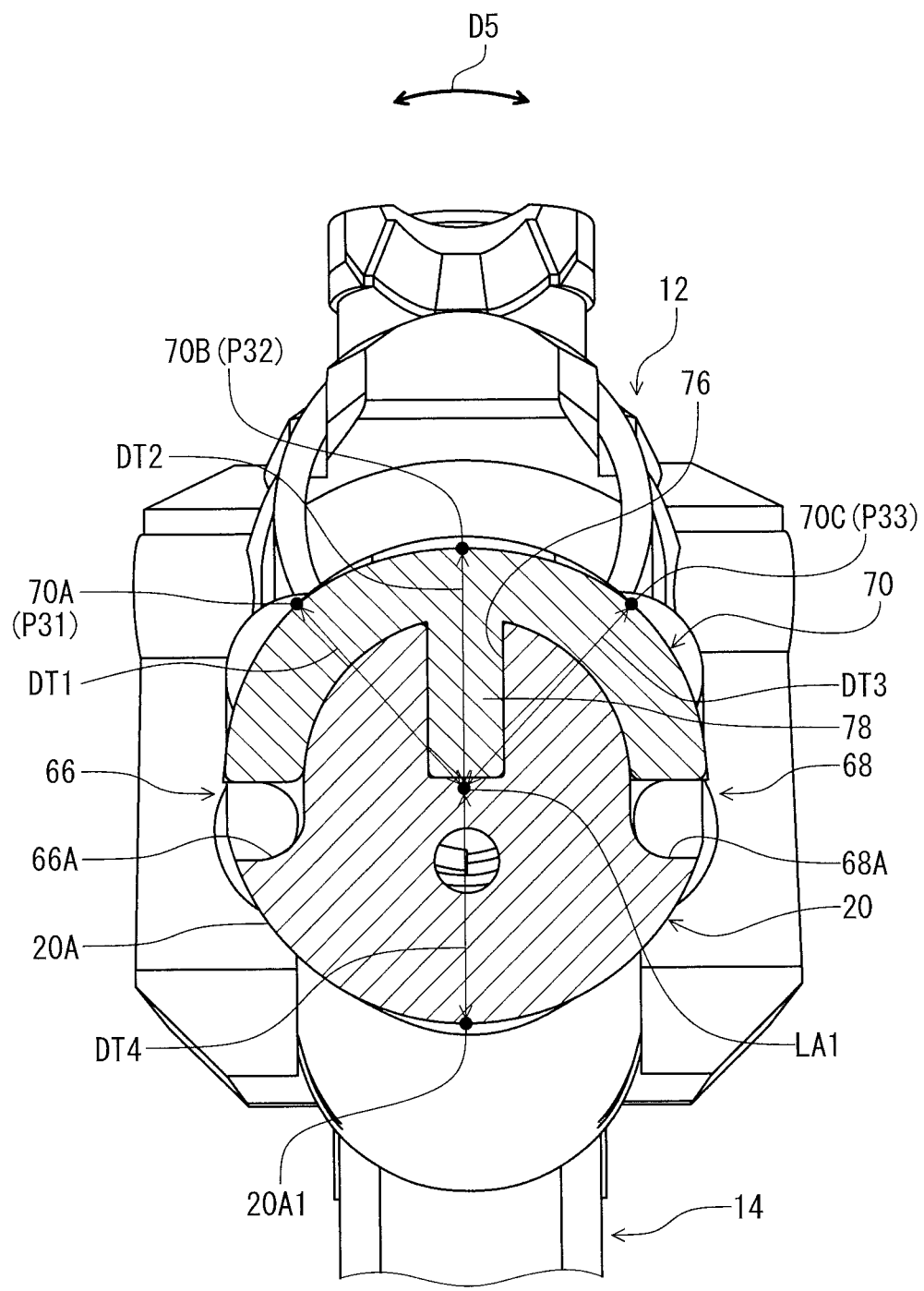
FIG. 19 is a cross-sectional view of the bicycle operating device taken along line XIX-XIX of FIG. 6.

As seen in FIG. 19, in this embodiment, the holding member 70 has a symmetrical shape with respect to the reference plane RP defined on the longitudinal axis LA1 and defined parallel to the guide direction D3. However, the holding member 70 can have an asymmetrical shape with respect to the reference plane RP.

The holding member 70 has a first outer surface 70A and a second outer surface 70B. The first outer surface 70A is provided at a first position P31. The second outer surface 70B is provided at a second position P32 different from the first position P31 of the first outer surface 70A in a circumferential direction D5 defined about the longitudinal axis LA1. A first distance DT1 is defined from the longitudinal axis LA1 to the first outer surface 70A. A second distance DT2 is defined from the longitudinal axis LA1 to the second outer surface 70B. The first distance DT1 is different from the second distance DT2. Specifically, the first distance DT1 is larger than the second distance DT2.

The holding member 70 further has a third outer surface 70C. The third outer surface 70C is provided at a third position P33 different from the first position P31 of the first outer surface 70A and the second position P32 of the second outer surface 70B in the circumferential direction D5. The third outer surface 70C is provided between the first outer surface 70A and the second outer surface 70B in the circumferential direction D5. A third distance DT3 is defined from the longitudinal axis LA1 to the third outer surface 70C. The third distance DT3 is equal to the first distance DT1 and different from the second distance DT2. The first distance DT1 and the third distance DT3 are larger than the second distance DT2.

The first outer surface 70A and the third outer surface 70C are contactable with the inner peripheral surface H1A (FIG. 13) of the free end H1 of the bicycle handlebar H. The second outer surface 70B is spaced apart from the inner peripheral surface HA1 of the free end H1 of the bicycle handlebar H in a state where the first outer surface 70A and the third outer surface 70C are in contact with the inner peripheral surface HA1 of the free end H1.

The outer circumferential surface 20A of the mounting portion 20 includes an outer contact surface 20A1. The outer contact surface 20A1 is provided on an opposite side of the second outer surface 70B with respect to the longitudinal axis LA1. A fourth distance DT4 is defined from the longitudinal axis LA1 to the outer contact surface 20A1. The fourth distance DT4 is larger than the second distance DT2. The first distance DT1 and the third distance DT3 are equal to the fourth distance DT4. The outer contact surface 20A1 is in contact with the inner peripheral surface HA1 of the free end H1 of the bicycle handlebar H in a state where the first outer surface 70A and the third outer surface 70C are in contact with the inner peripheral surface HA1 of the free end H1.

In this embodiment, the bicycle operating device 10 comprises the holding member 70, the movable member 72, and the guide structure 74. However, the mounting structure of the bicycle operating device 10 is not limited to this embodiment. The bicycle operating device 10 can include another structure such as a mounting clamp coupling the bicycle operating device 10 to the bicycle handlebar H.

Figure 20:
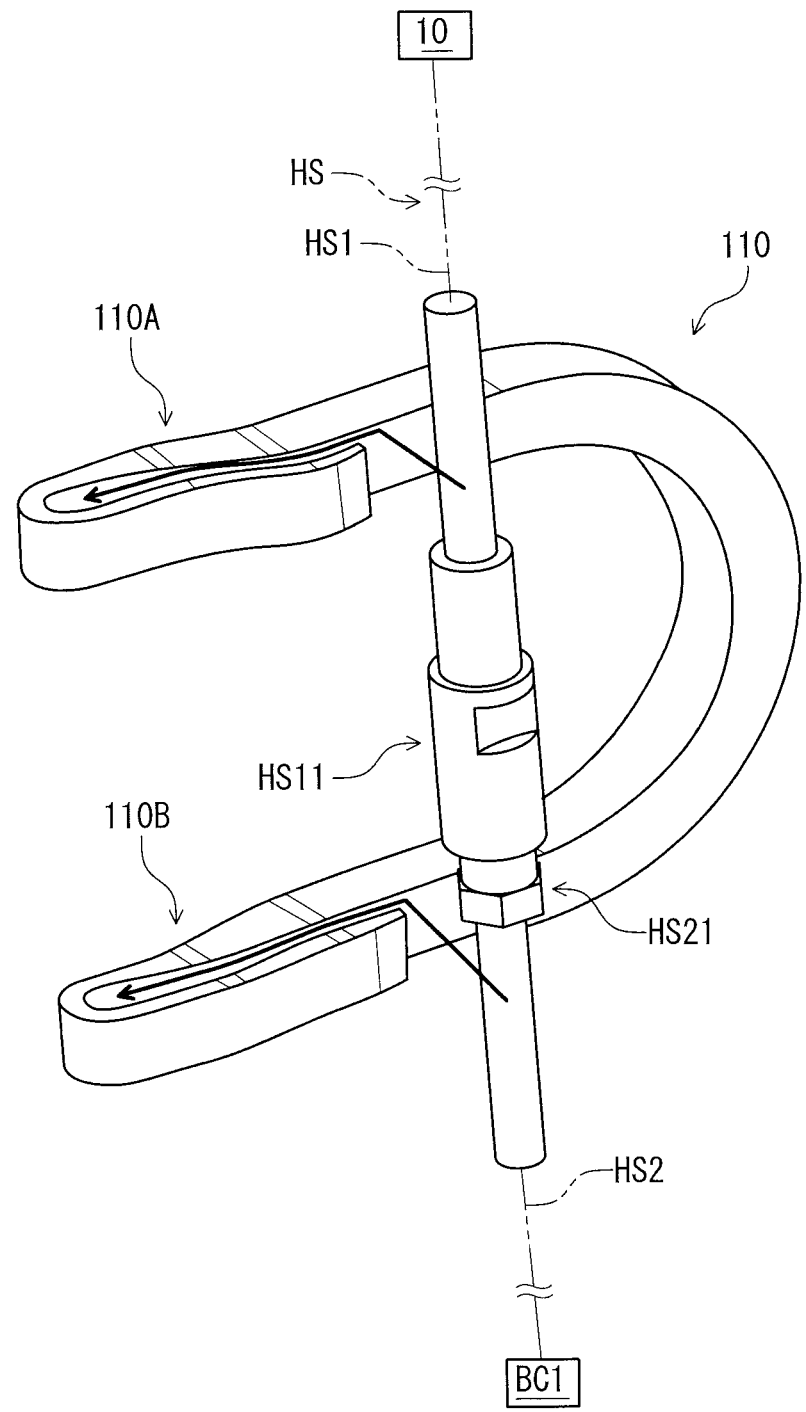
FIG. 20 is a perspective view of a hydraulic hose and a first holding tool for explaining a method of using the first holding tool.

As seen in FIG. 20, the hydraulic hose HS includes a first hydraulic hose HS1 and a second hydraulic hose HS2. The first hydraulic hose HS1 is connected to the bicycle operating device 10. The second hydraulic hose HS2 is connected to the bicycle component BC1. The first hydraulic hose HS1 includes a first connector HS11. The second hydraulic hose HS2 includes a second connector HS21 detachably connected to the first connector H11. The first connector HS11 includes a threaded hole (not shown). The second connector HS21 includes external threads engageable with the threaded hole. An olive and a connector insert are provided in the first connector HS11. Since structures of the first connector HS11, the second connector HS21, the olive, and the connector insert have been known in the bicycle field, they will not be described in detail here for the sake of brevity.

When the second connector HS21 is connected to the first connector HS11, a first tool such as a wrench is engaged with the first connector HS11, and a second tool such as a wrench is engaged with the second connector HS21 to tighten the second connector HS21 relative to the first connector HS11. One user need to hold the first hydraulic hose HS1 and the second hydraulic hose HS2 while the other user tightens the second connector HS21 relative to the first connector HS11.

Figure 21:
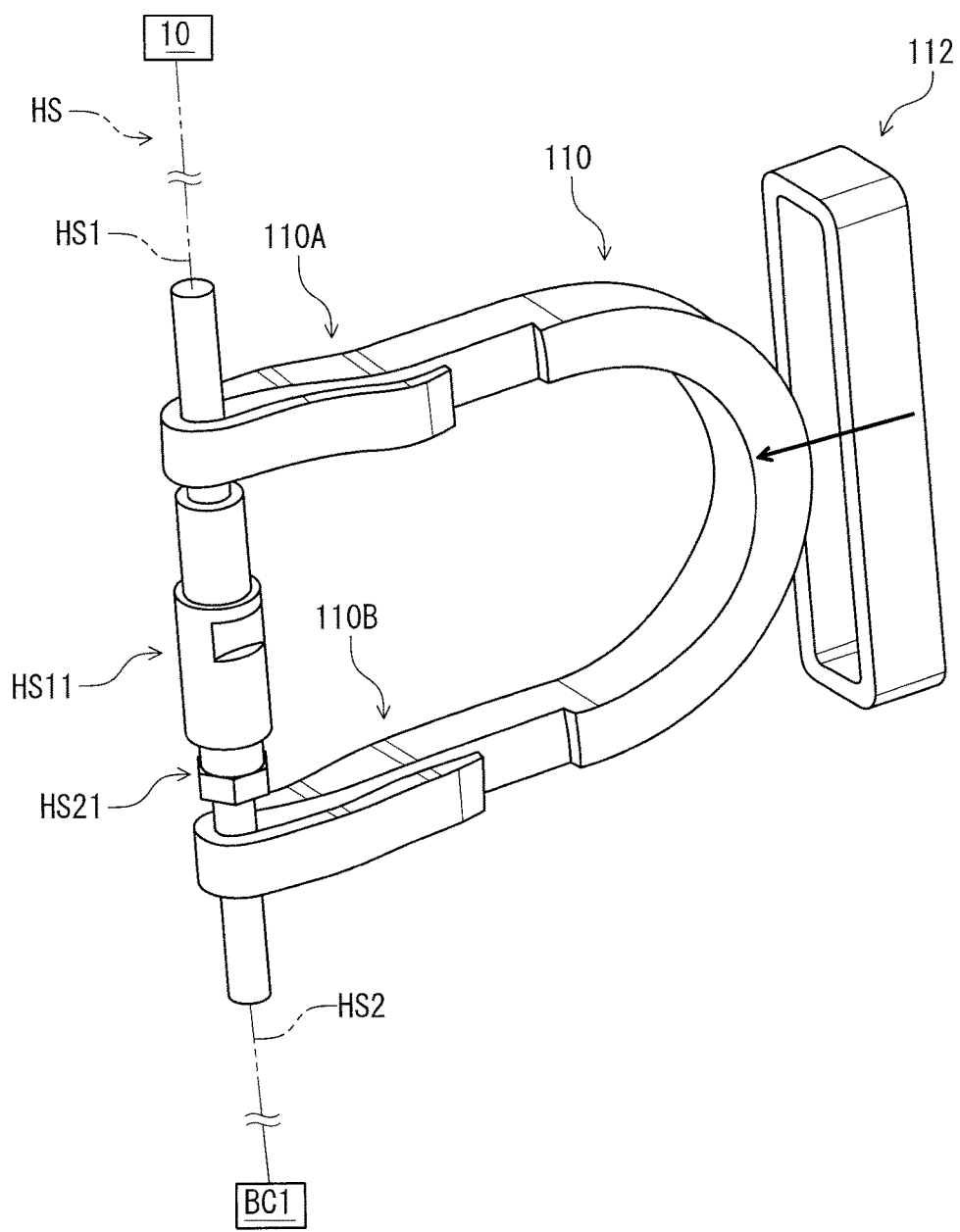
FIG. 21 is a perspective view of the hydraulic hose, the first holding tool, and a second holding tool for explaining a method of using the first holding tool and the second holding tool.

As seen in FIGS. 20 to 23, however, only one user can easily tighten the second connector HS21 relative to the first connector HS11 by using a first holding tool 110 and a second holding tool 112. As seen in FIGS. 20 and 21, the first holding tool 110 is attached to the first hydraulic hose HS1 and the second hydraulic hose HS2 in a state where the second connector HS21 is inserted in the first connector HS11. Specifically, the first holding tool 110 includes a first holding part 110A and a second holding part 110B. The first holding part 110A is attached to the first hydraulic hose HS1, and the second holding part 110B is attached to the second hydraulic hose HS2. The first hydraulic hose HS1 and the second hydraulic hose HS2 are held by the first holding part 110A and the second holding part 110B in the state where the second connector HS21 is inserted in the first connector HS11.

Figure 22:
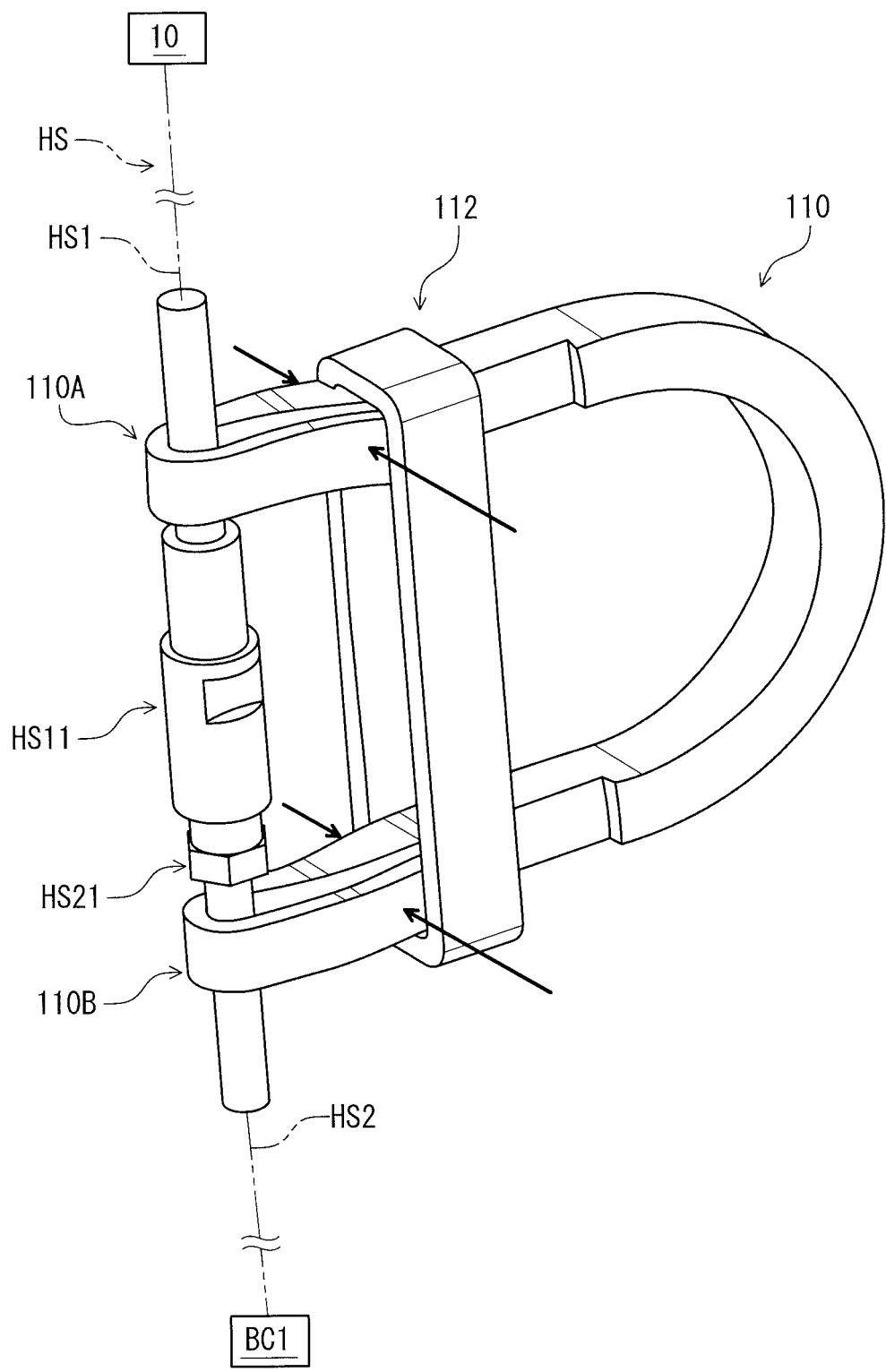
FIG. 22 is a perspective view of the hydraulic hose, the first holding tool, and the second holding tool for explaining the method of using the first holding tool and the second holding tool.
Figure 23:
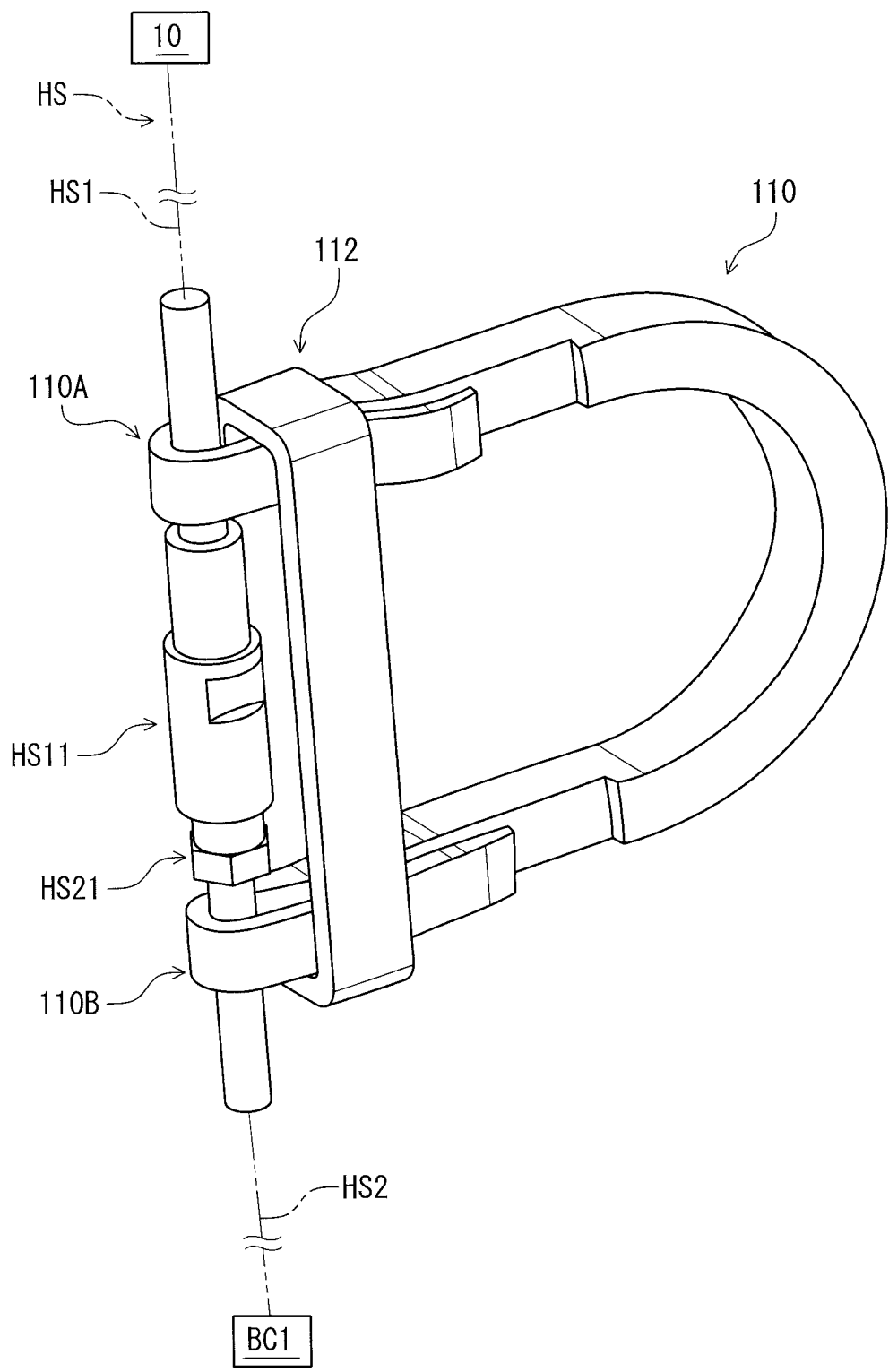
FIG. 23 is a perspective view of the hydraulic hose, the first holding tool, and the second holding tool for explaining the method of using the first holding tool and the second holding tool.

As seen in FIGS. 21 to 23, the second holding tool 112 is attached to the first holding tool 110. Specifically, the first holding part 110A and the second holding part 110B are squeezed by the second holding tool 112 to more strongly hold the first hydraulic hose HS1 and the second hydraulic hose HS2. In this state, the user can tighten the second connector HS21 relative to the first connector HS11 without holding the first hydraulic hose HS1 and the second hydraulic hose HS2.

The term "comprising" and its derivatives, as used herein, are intended to be open ended terms that specify the presence of the stated features, elements, components, groups, integers, and/or steps, but do not exclude the presence of other unstated features, elements, components, groups, integers and/or steps. This concept also applies to words of similar meaning, for example, the terms "have", "include" and their derivatives.

The terms "member", "section", "portion", "part", "element", "body" and "structure" when used in the singular can have the dual meaning of a single part or a plurality of parts.

The ordinal numbers such as "first" and "second" recited in the present application are merely identifiers, but do not have any other meanings, for example, a particular order and the like. Moreover, for example, the term "first element" itself does not imply an existence of "second element", and the term "second element" itself does not imply an existence of "first element."

The term "pair of", as used herein, can encompass the configuration in which the pair of elements have different shapes or structures from each other in addition to the configuration in which the pair of elements have the same shapes or structures as each other.

The term "a" or "an" entity refers to one or more of that entity. As such, the terms "a" (or "an"), "one or more" and "at least one" can be used interchangeably herein.

Finally, terms of degree such as "substantially", "about" and "approximately" as used herein mean a reasonable amount of deviation of the modified term such that the end result is not significantly changed.

Obviously, numerous modifications and variations of the present invention are possible in light of the above teachings. It is therefore to be understood that within the scope of the appended claims, the invention may be practiced otherwise than as specifically described herein.

What is claimed is:

1. A bicycle operating device comprising:
  a base member configured to be mounted to a free end of a bicycle handlebar, the base member having a longitudinal axis defined along a center axis of the free end of the bicycle handlebar in a mounting state where the base member is mounted to the free end of the bicycle handlebar, the base member including a cylinder bore having a cylinder center axis, the cylinder bore being at least partly arranged in the bicycle handlebar in the mounting state, the base member including a proximal portion extending within an interior of the bicycle handlebar in the mounting state, the proximal portion being disposed farther from the free end of the bicycle handlebar than the cylinder bore and having a center axis;
an operating member pivotally coupled to the base member about a pivot axis, the cylinder center axis being inclined relative to the longitudinal axis by an inclination angle equal to or larger than 4 degrees and inclined relative to the center axis of the proximal portion of the base member; and
a piston movably provided in the cylinder bore and operatively coupled to the operating member to move in the cylinder bore in response to a pivotal movement of the operating member.

2. The bicycle operating device according to claim 1, wherein
the base member includes a reservoir bore connected to the cylinder bore.

3. The bicycle operating device according to claim 2, wherein
the reservoir bore is closer to the pivot axis than the cylinder bore.

4. The bicycle operating device according to claim 2, wherein
the reservoir bore has a reservoir center axis, and
the pivot axis is provided between the reservoir center axis and the cylinder center axis.

5. The bicycle operating device according to claim 2, wherein
the reservoir bore has a reservoir center axis extending along the cylinder center axis.

6. The bicycle operating device according to claim 2, wherein
the base member includes a bleeding port to bleed a hydraulic fluid from the reservoir bore.

7. The bicycle operating device according to claim 1, wherein
the pivot axis is closer to the longitudinal axis than an outer circumferential surface of the free end of the bicycle handlebar in a direction perpendicular to the longitudinal axis in the mounting state.

8. The bicycle operating device according to claim 7, wherein
the base member includes a mounting portion configured to be mounted within an interior of the free end of the bicycle handlebar in the mounting state, the proximal portion of the base member being formed by a portion of the mounting portion, and
the pivot axis is closer to the longitudinal axis than an outer circumferential surface of the mounting portion in a direction perpendicular to the longitudinal axis.

9. The bicycle operating device according to claim 1, wherein
the inclination angle is equal to or smaller than 60 degrees.

10. The bicycle operating device according to claim 1, wherein
the cylinder center axis and the longitudinal axis of the base member define a reference plane.

11. The bicycle operating device according to claim 10, wherein
the pivot axis is perpendicular to the reference plane.

12. The bicycle operating device according to claim 10, wherein
the base member has a symmetrical shape relative to the reference plane.

13. The bicycle operating device according to claim 1, further comprising
an additional operating member attached to the base member to operate an additional bicycle component.

14. The bicycle operating device according to claim 13, wherein
the additional operating member includes an electrical switch configured to receive a user input to operate the additional bicycle component.

15. The bicycle operating device according to claim 1, wherein
the base member includes a bar-end contact surface configured to contact an end surface of the free end of the bicycle handlebar in the mounting state.

16. The bicycle operating device according to claim 1, wherein
the cylinder center axis is inclined relative to the longitudinal axis as viewed along the pivot axis.

17. The bicycle operating device according to claim 16, wherein
the cylinder center axis is downwardly inclined in a reference direction in the mounting state, the reference direction being defined to be parallel to the longitudinal axis and to be directed from the free end of the bicycle handlebar toward the pivot axis.

18. The bicycle operating device according to claim 1, wherein
the longitudinal axis is parallel to and spaced from the center axis of the proximal portion of the base member.

19. The bicycle operating device according to claim 1, wherein
the center axis of the proximal portion is radially outwardly disposed with respect to the longitudinal axis.

20. A bicycle operating device comprising:
a base member configured to be mounted to a free end of a bicycle handlebar, the base member having a longitudinal axis defined along a center axis of the free end of the bicycle handlebar in a mounting state where the base member is mounted to the free end of the bicycle handlebar, the base member including
a cylinder bore having a cylinder center axis,
a reservoir bore connected to the cylinder bore, and
a proximal portion extending within an interior of the bicycle handlebar in the mounting state, the proximal portion being disposed farther from the free end of the bicycle handlebar than the cylinder bore and having a center axis;
an operating member pivotally coupled to the base member about a pivot axis, the cylinder center axis being inclined relative to the longitudinal axis and inclined relative to the center axis of the proximal portion of the base member; and
a piston movably provided in the cylinder bore and operatively coupled to the operating member to move in the cylinder bore in response to a pivotal movement of the operating member.

21. The bicycle operating device according to claim 20, wherein
the longitudinal axis is parallel to and spaced from the center axis of the proximal portion of the base member.

22. The bicycle operating device according to claim 20, wherein the center axis of the proximal portion is radially outwardly disposed with respect to the longitudinal axis.

23. A bicycle operating comprising:

a base member configured to be mounted to a free end of a bicycle handlebar, the base member having a longitudinal axis defined along a center axis of the free end of the bicycle handlebar in a mounting state where the base member is mounted to the free end of the bicycle handlebar, the base member including a cylinder bore having a cylinder center axis, the cylinder bore being at least partly arranged in the bicycle handlebar in the mounting state;

an operating member pivotally coupled to the base member about a pivot axis, the cylinder center axis being inclined relative to the longitudinal axis by an inclination angle equal to or larger than 4 degrees; and a piston movably provided in the cylinder bore and operatively coupled to the operating member to move in the cylinder bore in response to a pivotal movement of the operating member, wherein the base member includes a reservoir bore connected to the cylinder bore, the base member includes a bleeding port to bleed a hydraulic fluid from the reservoir bore, and the pivot axis is closer to the longitudinal axis of the base member than the bleeding port in a direction perpendicular to the longitudinal axis.

24. A bicycle operating device comprising:

a base member configured to be mounted to a free end of a bicycle handlebar, the base member having a longitudinal axis defined along a center axis of the free end of the bicycle handlebar in a mounting state where the base member is mounted to the free end of the bicycle handlebar, the base member including a cylinder bore having a cylinder center axis, the cylinder bore being at least partly arranged in the bicycle handlebar in the mounting state;

an operating member pivotally coupled to the base member about a pivot axis, the cylinder center axis being inclined relative to the longitudinal axis by an inclination angle equal to or larger than 4 degrees; and a piston movably provided in the cylinder bore and operatively coupled to the operating member to move in the cylinder bore in response to a pivotal movement of the operating member, wherein the base member includes a cable guide portion configured to guide a control cable such that the control cable is unexposed to an outside of the bicycle handlebar in the mounting state.

25. The bicycle operating device according to claim 24, wherein the base member includes a mounting portion configured to be mounted within an interior of the free end of the bicycle handlebar, and the cable guide portion is at least partly provided on the mounting portion.

* * * * *